United States Patent
Pelletier et al.

(10) Patent No.: US 12,284,043 B2
(45) Date of Patent: Apr. 22, 2025

(54) METHODS FOR ENHANCED RELIABILITY FOR MBMS IN WIRELESS SYSTEMS

(71) Applicant: InterDigital Patent Holdings, Inc., Wilmington, DE (US)

(72) Inventors: Ghyslain Pelletier, Montreal (CA); Yugeswar Deenoo Narayanan Thangaraj, Chalfont, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 293 days.

(21) Appl. No.: 17/785,458

(22) PCT Filed: Dec. 16, 2020

(86) PCT No.: PCT/US2020/065241
§ 371 (c)(1),
(2) Date: Jun. 15, 2022

(87) PCT Pub. No.: WO2021/126924
PCT Pub. Date: Jun. 24, 2021

(65) Prior Publication Data
US 2023/0027089 A1    Jan. 26, 2023

Related U.S. Application Data

(60) Provisional application No. 62/951,123, filed on Dec. 20, 2019.

(51) Int. Cl.
*H04L 1/1829* (2023.01)
*H04L 1/1812* (2023.01)
(52) U.S. Cl.
CPC .......... *H04L 1/1854* (2013.01); *H04L 1/1812* (2013.01)

(58) Field of Classification Search
CPC ... H04L 1/1854; H04L 1/1812; H04L 1/1816; H04L 1/1819; H04W 4/06
See application file for complete search history.

(56) References Cited

U.S. PATENT DOCUMENTS

| | | | |
|---|---|---|---|
| 2010/0215004 A1* | 8/2010 | Yoo | H04L 1/0031 370/329 |
| 2012/0230280 A1* | 9/2012 | Chandra | H04L 1/1812 370/329 |

(Continued)

FOREIGN PATENT DOCUMENTS

WO    WO 2018112922 A1    6/2018

OTHER PUBLICATIONS

3rd Generation Partnership Project; Technical Specification Group Radio Access Network; NR; Physical layer procedures for control (Release 15), 3GPP TS 38.213 V15.3.0, Sep. 2018, 101 pages.

(Continued)

*Primary Examiner* — Dady Chery
(74) *Attorney, Agent, or Firm* — Flaster Greenberg P.C.

(57) ABSTRACT

A method performed by a Wireless Transmit/Receive Unit (WTRU) includes receiving a plurality of scheduling configurations indexed as a sequence for a hybrid automatic repeat request (HARQ) process, receiving a non-unicast downlink transmission from a node on a radio access network, wherein the non-unicast downlink transmission contains an information unit processed in accordance with a first scheduling configuration of the plurality of scheduling configurations, detecting errored reception of the information unit, determining a presence of at least a second scheduling configuration associated with the HARQ process, requesting retransmission of the information unit, and receiving a subsequent retransmission of the information unit using the second scheduling configuration.

17 Claims, 7 Drawing Sheets

(56) References Cited

U.S. PATENT DOCUMENTS

| | | | | |
|---|---|---|---|---|
| 2018/0206232 A1* | 7/2018 | Takeda | .................. | H04W 72/12 |
| 2018/0279324 A1* | 9/2018 | Wang | .................... | H04L 5/0055 |
| 2019/0103951 A1* | 4/2019 | Park | .................. | H04W 72/0446 |
| 2019/0109677 A1* | 4/2019 | Wang | .................... | H04L 5/1469 |
| 2019/0238278 A1* | 8/2019 | Dudda | .................. | H04L 1/1896 |
| 2021/0126753 A1* | 4/2021 | Mochizuki | .......... | H04W 72/542 |
| 2021/0359729 A1* | 11/2021 | Lin | ....................... | H04L 1/1819 |
| 2022/0353026 A1* | 11/2022 | Yeo | ....................... | H04L 1/1854 |
| 2023/0336290 A1* | 10/2023 | Mochizuki | .......... | H04W 72/542 |

OTHER PUBLICATIONS

3GPP TS 38.331, "Radio Resource Control (RRC) protocol specification," v15.4.0, 2018-12, 471 pages.

3rd Generation Partnership Project; Technical Specification Group Radio Access Network; NR; Medium Access Control (MAC) protocol specification (Release 15); 3GPP TS 38.321 V15.1.0, Mar. 2018, 67 pages.

* cited by examiner

METHODS FOR ENHANCED RELIABILITY FOR MBMS IN WIRELESS SYSTEMS

CROSS REFERENCE TO RELATED APPLICATIONS

This application claims the benefit, under 35 U.S.C. § 371 of International Application PCT/US2020/065241, filed 16 Dec. 2020, which was published on 24 June April 2021 in English and which claims the benefit of U.S. provisional patent application No. 62/951,123 filed 20 Dec. 2019, the contents of which is incorporated by reference herein in its entirety for all purposes.

BACKGROUND

Multimedia Broadcast Multicast Systems (MBMS) services may be delivered over wireless according to a number of methods including via unicast cellular transmissions (UC), Multicast-Broadcast Single Frequency Network (MBSFN) and Single Cell Point To Multipoint (SC-PTM). To facilitate support of these and other scenarios, MBMS services may be enhanced when used in a New Radio (NR) environment.

SUMMARY

One method performed by a Wireless Transmit/Receive Unit (WTRU) includes receiving a plurality of scheduling configurations indexed as a sequence for a hybrid automatic repeat request (HARQ) process, receiving a non-unicast downlink transmission from a node on a radio access network, wherein the non-unicast downlink transmission contains an information unit processed in accordance with a first scheduling configuration of the plurality of scheduling configurations, detecting errored reception of the information unit, determining a presence of at least a second scheduling configuration associated with the HARQ process, requesting retransmission of the information unit, and receiving a subsequent retransmission of the information unit using the second scheduling configuration.

Another method performed by a WTRU configured with a non-unicast downlink transmission method, the downlink transmission from a node on a radio access network includes receiving a sequence of protocol data units (PDUs) from the node, generating a status report (SR), transmitting the SR to the node, the SR requesting a level 2 (L2) retransmission of at least one missing PDU, receiving the L2 retransmission from the node, and using the L2 retransmission to address at least one missing PDU from the sequence of PDUs.

Although various embodiments are described and/or claimed herein in which an apparatus, system, device, etc. and/or any element thereof carries out an operation, process, algorithm, function, etc. and/or any portion thereof, it is be understood that any embodiments described and/or claimed herein assume that any apparatus, system, device, etc. and/or any element thereof is configured to carry out any operation, process, algorithm, function, etc. and/or any portion thereof.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref") in the Figures indicate like elements, and wherein.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application. In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Figure 1A:
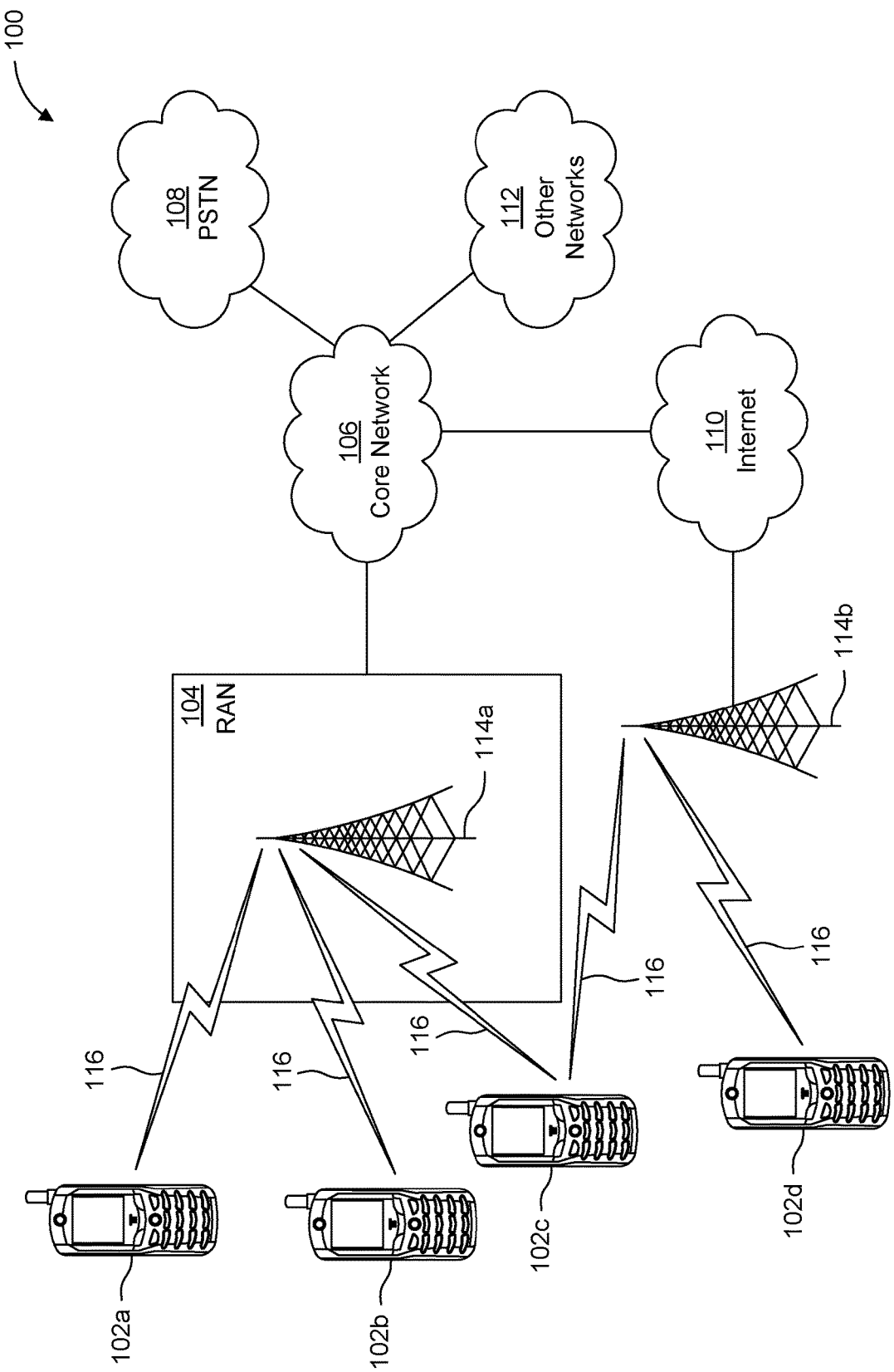
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
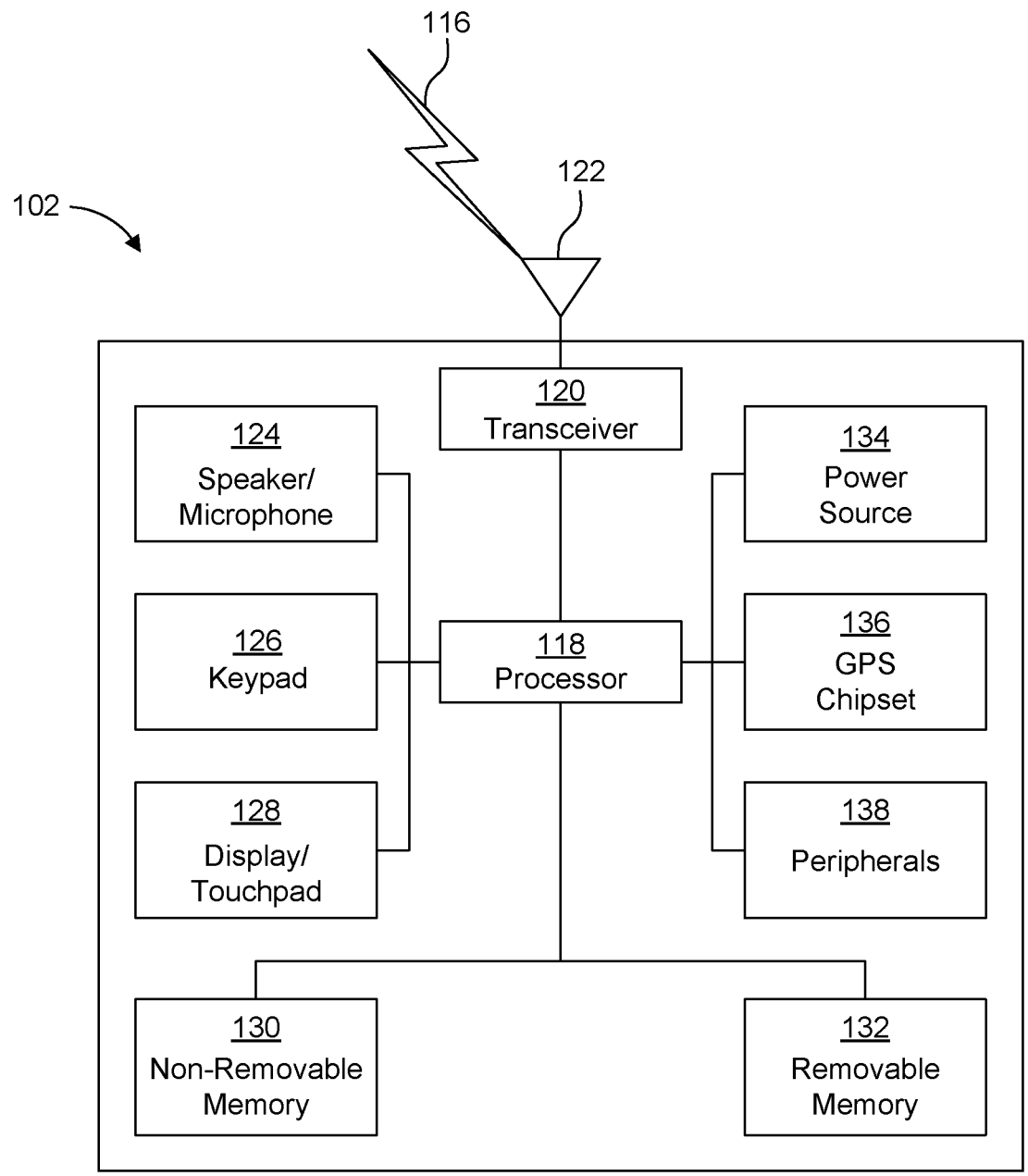
FIG. 1B is a system diagram illustrating an example WTRU that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
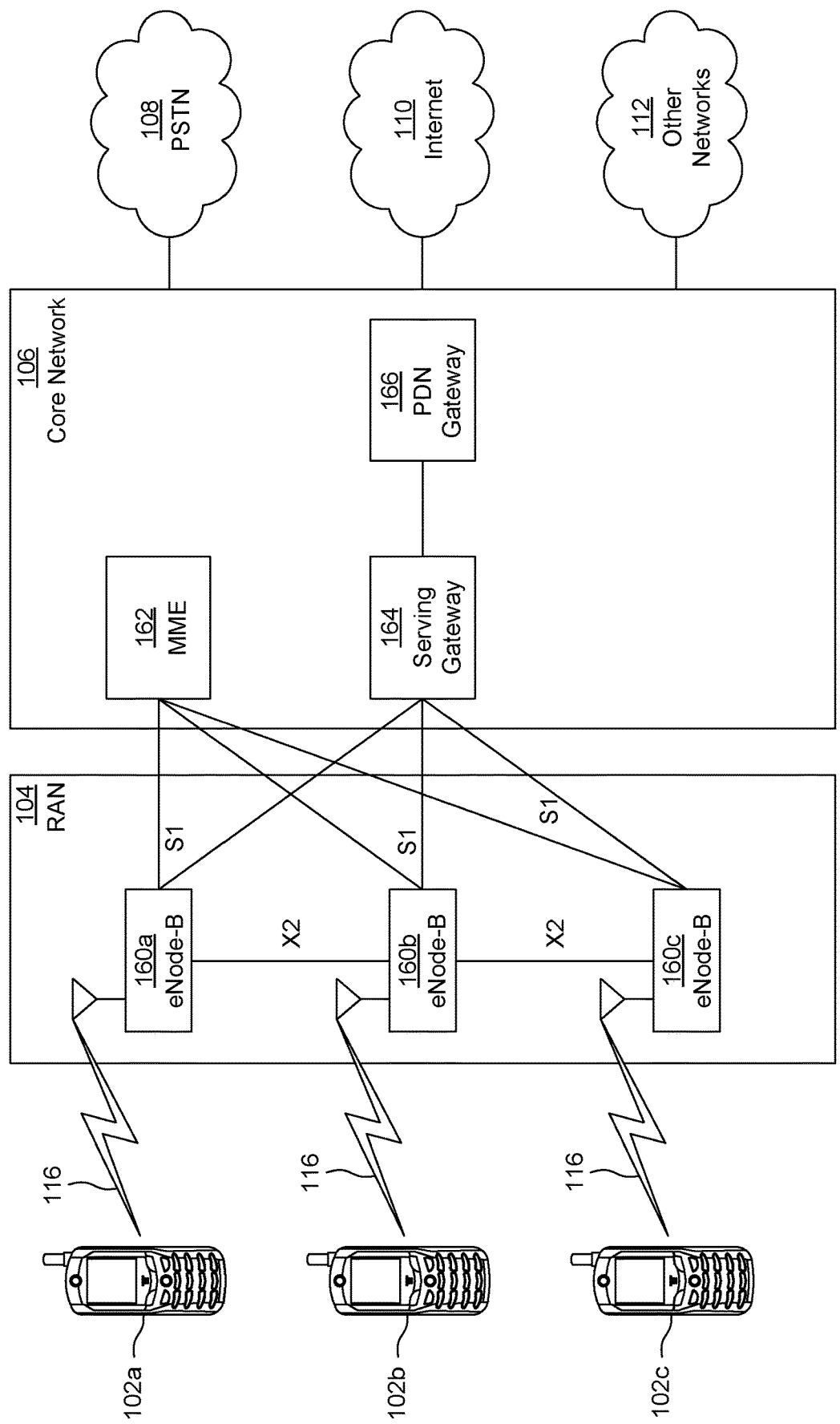
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
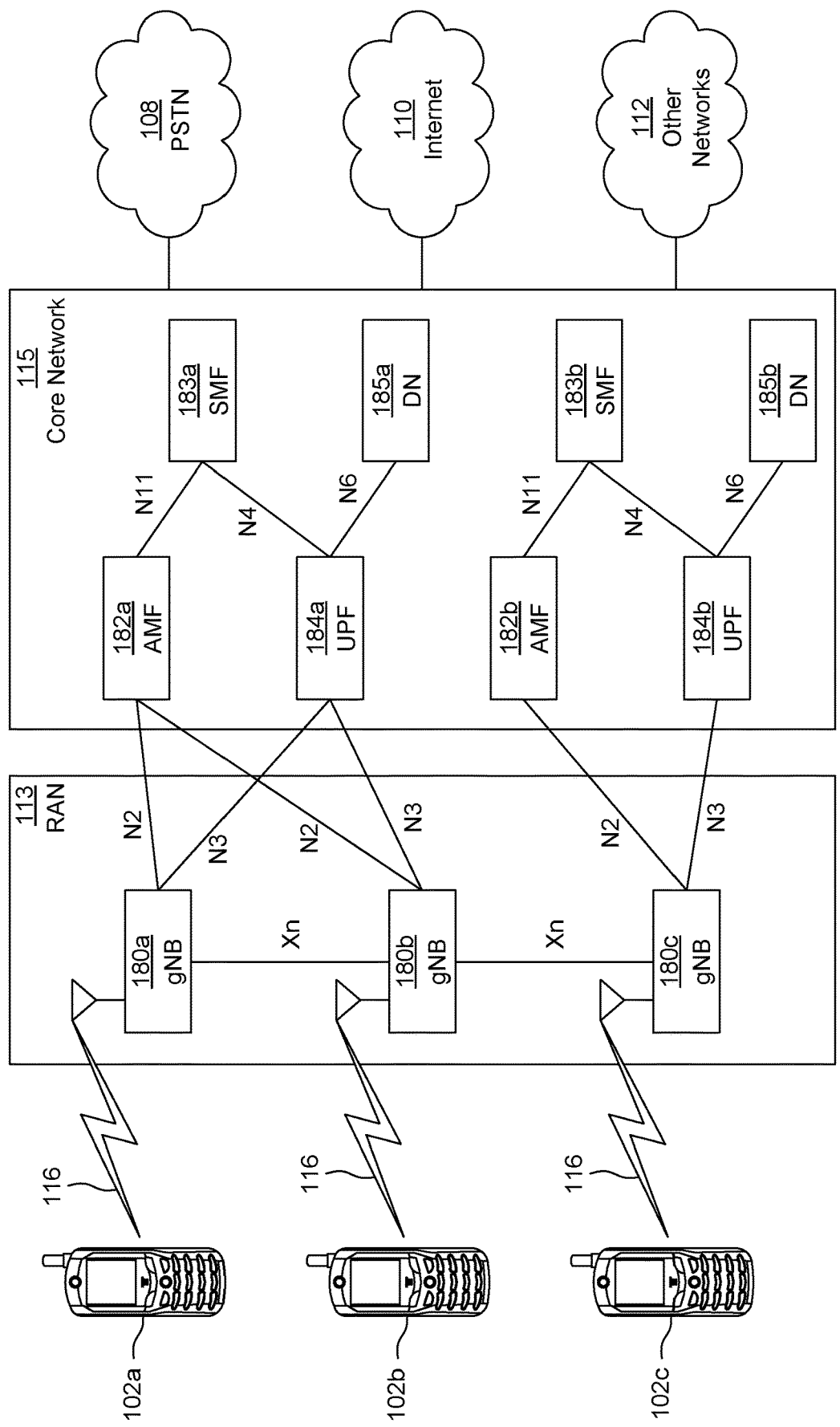
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of (non-access stratum) (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU/UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Examples provided herein do not limit applicability of the subject matter to other wireless technologies, e.g., using the same or different principles as may be applicable.

As explained herein, a wireless transmit receive unit (WTRU) may be an example of a user equipment (UE). Hence the terms UE and WTRU may be used in equal scope herein.

The following description is for exemplary purposes and does not intent to limit in any way the applicability of the methods described herein to other wireless technologies and/or to wireless technology, when applicable. The term network in this disclosure may refer to one or more gNBs which in turn may be associated with one or more Transmission/Reception Points (TRPs), or to any other node in the radio access network.

Multimedia Broadcast Multicast System (MBMS)

Multimedia Broadcast Multicast Systems (MBMS) services may be delivered over a wireless system according to a number of methods including via unicast cellular transmissions (UC), Multicast-Broadcast Single Frequency Network (MBSFN) and Single Cell Point to Multipoint (SC-PTM).

SC-PTM supports broadcast/multicast services over single cell, and the broadcast/multicast area can be dynamically adjusted cell by cell according to a user's distribution. SC-PTM transfers the broadcast/multicast services using LTE downlink shared channel (e.g., the physical downlink shared channel (PDSCH)), and it is scheduled using a common radio-network temporary identifier (RNTI) (e.g. a Group-RNTI) for a group of users. The SC-PTM scheduling is quite agile and radio resources may be dynamically assigned in time and frequency domain by physical downlink control channel (PDCCH) based on real time traffic load possibly every transmission time interval (TTI). SC-PTM can be especially suitable for scenarios where broadcast/multicast service is expected to be delivered to a limited number of cells e.g., due to user interests and the concerned cells may dynamically change due to user movement. SC-PTM allows efficient radio utilization and flexible deployment of number of applications, e.g. critical communications, traffic information for cars and on-demand TV services, etc.

In the instance of MBSFN, the transmissions from different cells are arranged to be identical and time aligned so that it appears as a single transmission from the WTRU perspective. In order to enable time synchronization among eNBs, a notion of MBSFN synchronization areas is defined. An MBSFN Area consists of a group of cells within an MBSFN Synchronization Area of a network which are coordinated to achieve an MBSFN Transmission. MBMS architecture defines various logical entities to perform network functions applicable for MBMS transmission. An MCE (Multi-cell/Multi-cast coordination entity) performs admission control, decides whether to use SC-PTM or MBSFN, suspension and resumption for MBMS services etc. An MBMS gateway (MBMS-GW) performs session control signaling and forwards the MBMS user data to eNBs via IP multicasting.

MBMS in Long Term Evolution (LTE)

In LTE, MBMS supports either unicast, SC-PTM, or MBSFN transmissions. Frequency domain resource allocation is not supported as the MBMS transmission takes up whole bandwidth (BW). Such design can become inefficient in deployments with large bandwidths. LTE MBMS resource allocation is fairly semi-static. The WTRU acquires MBMS information following sequential reception of configuration and/or scheduling information on system information block (SIB) SIB2, then SIB13, then on the multicast control channel (MCCH) and finally reception of multicast traffic channel (MTCH).

MBMS in New Radio (NR)

Transmission Mode—WTRU Configuration Aspect e.g., when MBMS is Configured

While not limiting scope or applicability to similar wireless delivery methods, a transmission mode herein refers to include transmissions methods such as unicast, multicast (e.g., SC-PTM) and broadcast (e.g., SFN), mixed-mode (WTRU can receive both unicast and at least one of multicast or broadcast). The receive-only mode (ROM) may be a special case of non-unicast modes. The sidelink interface e.g., for direct WTRU-to-WTRU communications may be a special case of a transmission mode. A transmission mode may be used for delivery of services with different quality of service (QoS), e.g. enhanced mobile broadband (eMBB), Ultra Reliable Low Latency Communications (URLLC) and/or MBMS services. A transmission mode may be used for delivery of services to one (e.g., unicast) or multiple receivers (multicast, groupcast or broadcast). Examples of services to multiple users include vehicle to everything (V2X) services (e.g., groupcast), MBMS services (e.g., multicast, broadcast). MBMS mode or MBMS transmission mode may also be used to refer to a WTRU's transmissions mode herein.

Delivery of MBMS Service—the WTRU's Configuration Aspects for Transmission of MBMS Data Services While not limiting scope or applicability to similar delivery methods for MBMS data and/or control information, a WTRU configured to operate with a given transmission mode to exchange MBMS-related data may have further configuration aspects for the delivery of MBMS services. One such aspect may be the mapping of data (or signaling) bearers for the configured transmission method(s) to exchange MBMS-related data e.g., the layer 2 (L2) bearer configuration for MBMS. For example, a WTRU may be configured for mixed-mode transmissions (e.g., unicast and multicast) with the delivery of MBMS data performed only using e.g., multicast (and/or broadcast) transmissions and other services being transmitted over unicast (e.g., eMBB, URLLC). For example, a WTRU may be configured for mixed-mode transmissions (e.g., unicast and multicast) with the delivery of MBMS data performed using both unicast and multicast transmissions, irrespective of whether the WTRU is being active with other services e.g., using unicast transmissions (e.g., eMBB, URLLC).

Possible Use Cases and Deployments for MBMS NR

NR is Expected to Support One or More of the Following Use Cases:

- V2X, Sidelink and public safety. Such as in 3GPP TS 22.185 "Service requirements for V2X services" requires that "The 3GPP system shall be able to distribute information in a resource efficient way to large numbers of WTRUs supporting V2X application".
- IoT (Narrow Band (NB) IoT and enhanced MTC (eMTC)) devices (e.g. for software updates), smart grids/utilities.
- TV Video and Radio services in 5G—linear TV, Live, smart TV, managed and OTT content distribution, radio services. Such as in:
  a. Video distribution (when multiple users are concurrently watching the same live streaming).
  b. Large peaks in concurrent consumption of OTT services via unicast media streams.
  c. Immersive six degrees of freedom (6DoF) Volumetric Streaming is much larger than traditional flat, or even 360-degree videos.
- Push services (e.g. advertisements and weather broadcast)
- Ethernet broadcast/multicast for factory automation
- Xtended reality, Group gaming.

Support for New Enablers and Requirements in NR.

NR is Expected to Include One or More of the Following Enablers:

Service switching between unicast, multicast/broadcast and mixed mode operation. A change in service may be triggered due to one or more of the following reasons:

WTRU mobility: This includes different scenarios for mode switch:
  a. UniCast (UC)↔SC-PTM
  b. UC↔MBSFN
  c. SC-PTM↔SC-PTM
  d. Intra-eNB/intra-MBMS area Inter-cell mobility
  e. Inter-eNB/intra-MBMS area Inter-cell mobility
  f. Inter-MBMS area mobility
  g. Inter-RAT mobility with change of transmission mode
  h. Inter-RAT mobility without change of transmission mode All the above may be with or without service continuity, lossy or lossless.
  i. Main challenge enabling service continuity may be for IDLE/INACTIVE WTRUs.

User activity:
  a. Users may interact with a playback function and have some control over the media stream.
  b. End user interaction with live or shared content by means of Uplink channel to increase user engagement and monetization possibility. E.g. use cases are video distribution, advertising and public safety use cases.

WTRU density:
  a. Changes in the number of users acquiring and receiving a MBMS service, e.g. a threshold may be met whereby system efficiency may be increased by changing MBMD transmission mode.
  b. For V2X proximity/WTRU range within an area Link condition:
  a. Given different characteristics for resources between e.g. multicast and unicast transmissions for a given WTRU, the quality may become lower for one than for the other.

Dynamic Control of Transmission Area and/or Transmission Resources

Dynamic control of transmission resources and/or delivery areas may be motivated by at least one of the following reasons:

Regional TV/Radio services occurring at certain times of the day.

Fluctuation/variation in on-demand MBMS services, in services with support for uplink data or in terms of support for higher reliability.

Target area for group communication and live video might be around a specific place or triggered by an event. Such area might change due to mobility of interested users.

In terms of timescale, a change in SFN area may be slower than adjusting resources between UC/MB/BC.

Reliability of the Transmission

MBMS service may support application level retransmissions. However, the reliability and efficiency tradeoff offered by application level methods may be costly in terms of spectrum efficiency. Furthermore, those methods may not be enough to meet lower latency requirements. Different MBMS services might have different latency, efficiency and reliability requirements. Finally, one drawback of previous MBMS releases was severe degradation with doppler which makes it difficult to use in high speed environments.

The following use cases may be further considered:
Power grid distribution (3GPP TR 22.804), with a delay of 5 ms and packet error rate of 10-6.
V2X (3GPP TR 22.186): "Sufficient reliability should be provided even for cells having no values in this table (not clearly defined)". For latency, 20 ms is required for information sharing between WTRUs and road side unit (RSU).

Requirements for mission critical push to talk (MCPTT) (e.g. key performance indicator (KPI) KPI3, mouth-to-ear latency of 300 ms) should be also taken into consideration.

Type of Devices in Scope

The type of devices that may be deployed as MBMS receivers may range from Read-Only Mode (ROM) WTRUs that are not capable and/or expected to perform uplink transmissions for acquiring and receiving MBMS transmissions up to WTRUs implementing more complex functionality—including functions and procedures requiring uplink transmissions. In addition, more complex WTRUs may support carrier aggregation, dual connectivity, multiple radio interfaces active concurrently and (possibly concurrent) operation across different frequency ranges (FR) (e.g., FR1 and FR2).

Methods for Enhanced Reliability in Wireless MBMS Systems

Methods described herein are exemplified based on transmissions and delivery of MBMS services. Those methods are not limited to such scenarios, systems and services and may be applicable to any type of transmissions and/or services, including but not limited to V2X, extended reality, gaming, Internet of things/machine type communications (IoT/MTC), industrial use cases etc.

A WTRU configured for reception of data for a MBMS service may be configured with a data radio bearer (DRB) dedicated to the MBMS reception (e.g., a mDRB). MBMS service and mDRB may be considered equivalent when discussed from the L2 and L3 perspective herein. A MBMS service may be configured with zero, one or more mDRBs.

Open Issues

Different functions and procedures of the NR system may be augmented with new enabling functionality to achieve the objectives listed in previous sections e.g., seamless change of MBMS transmission mode, dynamic allocation of resources for any MBMS transmission mode and support for high transmission and service reliability.

The aspects listed below are further classified as "baseline" enablers and "optional" enablers; while not limiting the individual applicability and/or alternative combinations of related methods within any MBMS system, the combination of methods labelled as "baseline" may represent an exemplary embodiment that can meet some or all the above objectives. However, the term "baseline" is not intended to indicate a required feature. Benefits from "baseline" and "optional" features may be combined in any form unless otherwise specifically stated to achieve or enhance a capability in NR.

MBMS can support retransmissions and varying level of coding robustness at the application layer. However, any retransmission-based method either increases the end-to-end latency and/or lowers the spectral efficiency of the delivery of the service. In addition, while MBMS have traditionally focused on error-resilient media services, perceptual concealment of transmission errors for streaming applications and on retransmissions mechanisms for latency-tolerant application, support for much higher reliability and much lower latency (e.g., aiming to be at par with and/or support URLLC services) may remain a challenge for MBMS services especially while remaining spectrally efficient.

One issue addressed herein is thus related to the support of Hybrid Automatic Repeat Request (HARQ) retransmissions, irrespective of:

the transmission mode used for the MBMS service(s), e.g., supporting multicast, groupcast, broadcast and mixed-mode;

the radio resource control (RRC) connectivity state of a WTRU, e.g. supporting IDLE, INACTIVE or CONNECTED mode;

The WTRU's capability to perform uplink transmissions, e.g. supporting ROM devices. This includes specific enablers for enabling HARQ addressing (HARQ ID space), soft combining, processing for MBMS transmissions, including when received over different data channels, cells or the likes. WTRU-specific HARQ feedback procedure and transmissions in the context of multicast and broadcast transmissions are also in scope. HARQ processing could also be consider as a component for MBMS service supervision, e.g. to trigger either a physical layer recovery procedure (e.g., similar to radio link failure (RLF)) and/or a MBMS PDU retransmission request/Status Report (SR) procedure. This can be useful to enable higher reliability or larger MBMS coverage areas for MBMS services.

Another issue addressed herein is further related to the support of L2 retransmissions, for:

Lossless change of transmission mode, without L3 mobility;

Lossless change of transmission mode, with L3 mobility. This may include specific enablers for L2 sequencing, status reporting format (e.g., time window, last in-sequence received, etc.) and triggers, cumulative retransmissions (e.g., as a possible default behavior over any transmission mode) or selective retransmissions (e.g., as a possible optimization over unicast transmissions). MBMS protocol data unit (PDU) sequencing could also be considered as a component for MBMS service supervision e.g., similar to in-synch/out-synch counting for physical layer radio link monitoring (RLM). Split DL MBMS bearer operation may also be considered. MAC-based, packet data convergence protocol (PDCP)-based, or RRC-based PDU retransmissions and/or status reporting can be considered. Handling of possible duplicates may be considered.

This can be useful to enable lossless MBMS mode change and/or mobility between MBMS areas/cells.

Another issue addressed herein is further related to the MBMS service connectivity and recovery, for:

Radio Link Monitoring and recovery, without L3 connectivity;

Radio Link Monitoring and recovery, with L3 connectivity;

L3 mobility with conditional handover.

This may include specific enablers for continuity of MBMS services when the WTRU changes the transmission mode and/or the L2 configuration for an ongoing MBMS services.

WTRU Capabilities and/or Configuration Aspects for MBMS Operation.

WTRU Capabilities

A WTRU may support MBMS operation. One of more aspects of such support may be a capability of a given WTRU. For example, a WTRU that supports MBMS operation may further support different capabilities for at least one of:

Transmission modes, e.g., the WTRU may support one or more modes e.g., unicast transmission, multicast transmission e.g., SC-PTM and/or broadcast transmission e.g., MBSFN and/or mixed-mode transmissions. In other words, a WTRU may report capability to support all or a subset of all MBMS modes. Possibly, the WTRU may report whether beamforming is supported for a given MBMS mode for the DL, for the UL or for both. This capability may include support for specific transmission mode(s) and/or support for specific L2 configuration e.g., such as bearer configuration and mapping to respective transmission methods;

Frequency Range (FR) operation e.g., the WTRU may support MBMS operation for specific range(s) of frequencies e.g., per FR. This may be supported per other aspects of the WTRU's capability e.g., the WTRU may report support for a specific MBMS mode for a given FR only.

MBMS transitions, e.g., the WTRU may support one or more transition between transmission modes, possibly as a function of the supported transmission modes for the WTRU. In other words, the WTRU may support all or a subset of all possible transitions for the transmission modes that it supports. Possibly, the WTRU may support specific transitions between specific FRs;

Reliable operation, e.g. the WTRU may support one or more aspects and/or procedures related to management of block error rate (BLER), loss of transport block (TB) (e.g., HARQ processing), management of packet losses (e.g., cumulative or selective retransmissions), service continuity (e.g., mobility-related procedures) and possibly uplink feedback in support of one or more of those aspects (e.g., physical uplink control channel (PUCCH) feedback, uplink control information (UCI) on physical uplink shared channel (PUSCH), user plane status reports and/or control plane uplink information);

Frequency Range (FR) operation e.g., the WTRU may support MBMS operation for specific range(s) of frequencies e.g., per FR. This may be supported per other aspects of the WTRU's capability e.g., the WTRU may report support for a specific MBMS mode for a given FR only.

Mixed-mode operation e.g., the WTRU may support simultaneous operation for one or more transmission modes and for unicast services/transmissions. Such support may be for radio resource control (RRC) Connected, for RRC Inactive or for both RRC modes of operation. Such support may be further defined in terms of at least one of:

a. Mixed-mode being supported within the same cell e.g., single cell, or across different cells e.g., using carrier aggregation and/or dual connectivity (DC). For dual connectivity (DC), support may be for specific dual connectivity combinations (if applicable) e.g., New Radio dual connectivity (NR DC), NR-RAN-E-UTRA Dual Connectivity (NE-DC) and/or EN-DC (E-UTRAN New Radio-Dual Connectivity). This may translate into whether the WTRU may use a single or multiple MAC instances to operate with mixed-mode operation;

b. Mixed-mode being supported within the same frequency band, or across different frequency bands. This may translate into whether the WTRU may use a single or multiple transceiver chain to operate with mixed-mode operation;

c. Mixed-mode being supported within the same FR, or across different FRs. This may translate into whether the WTRU may use beamforming for one mode of operation when configured with mixed-mode operation, but not for the other mode;

d. Mixed-mode being supported using time-division multiplexing (TDM). This may translate into whether the WTRU may be configured simultaneously with MBMS services and unicast services but not in terms of transmissions (e.g., the WTRU does not expect scheduling of both types of transmissions overlapping in the time domain) and/or transmission opportunities (e.g., the WTRU cannot be scheduled with both types of transmissions overlapping in the time domain);

For example, a WTRU may be capable of simultaneous operation of unicast services/transmissions and multicast e.g., SC-PTM operation while it may not support simultaneous operation with broadcast e.g., MBSFN operation.

Other aspects of the methods described herein may also be capability aspects of a WTRU. Aspects that may be part of a WTRU's capability for MBMS may further be configuration aspects of the WTRU.

WTRU Configuration for MBMS

A transmission mode may be characterized based on physical transmission attributes, which may further be configuration aspects of the WTRU. For example, the physical transmission attributes may include one or more of the following:

- Waveform associated with the transmission, for example, Orthogonal Frequency-Division Multiplexing (OFDM), Discrete Fourier Transform Spread OFDM (DFT-S-OFDM) or the like.
- Numerology associated with the transmission, for example, Subcarrier spacing (SPS), Cyclic prefix (CP), Transmission Time Interval (TTI), etc.
- Physical downlink control channel: Type of physical control channel associated with the transmission (e.g., PDCCH or a control channel dedicated for MBMS scheduling), mapping to time/frequency resource elements, Downlink Control Information (DCI) formats, etc.
- Physical downlink data channel: Type of physical channel associated with the transmission (e.g., PDSCH or a channel dedicated for MBMS transmissions), mapping to time/frequency resource elements, scrambling, MCS, etc.
- Control channel structure: Control channel configuration aspects including control channel format, CORESET, search space, aggregation level, scheduling periodicity, scheduling offset etc.
- Cell or multi-cell transmission: Whether the coverage of MBMS transmission is limited to a single cell or whether synchronous transmission can be assumed in a preconfigured area consisting of two or more cells.
- Physical uplink control channel: Type of physical control channel associated with uplink transmissions for control information (e.g., PUCCH or a control channel dedicated for MBMS uplink control information), mapping to time/frequency resource elements, UCI formats, etc.
- Physical uplink data channel: Type of physical channel associated with uplink transmissions for data-like information (e.g., PUSCH or a channel dedicated for MBMS uplink transmissions), mapping to time/frequency resource elements, scrambling, Modulation and Coding Scheme (MCS), etc. Such channel may be useful for e.g., MBMS sessions control, quality of experience reporting, UCI, "user plane" transmission status report, or the likes.
- Data Radio Bearer (mDRB): the WTRU may be configured with a data radio bearer and associated with a MBMS service. Such mDRB may be configured e.g. with Radio Link Control Unacknowledged Mode (RLC UM) and PDCP. A mDRB may be an instance of a DRB e.g., it may inherit one of more properties of unicast DRBs e.g., priorities, logical channel (LCH) restrictions for uplink transmissions and PDCP status report (SR) configuration for DL status reporting. A mDRB may have a separate security context from other (m)DRBs i.e, such as a security context that is specific to a given MBMS service and/or MBMS mode.
- Signaling Radio Bearer (mSRB): the WTRU may be configured with a signaling radio bearer and associated with a MBMS service. A mSRB may have a separate security context from other (m)SRBs i.e., such as a security context that is specific to a given MBMS service and/or MBMS mode. The mSRB may support procedures related to MBMS service continuity e.g., retransmission requests, change and/or reconfiguration of MBMS mode, security key update, mobility-related aspects. This may be useful when a network entity separate from the network RRC entity manages MBMS-specific aspects of the MBMS operation (e.g., using group common MBMS control plane signaling).
- Feedback: The need and type of uplink (UL) feedback associated with the MBMS transmission. In one solution, the WTRU may be configured to not transmit UL feedback. In another solution, the WTRU may be configured to transmit transmission-related feedback e.g., Channel State Information (CSI), HARQ or the like. In yet another solution, the WTRU may be configured to transmit data plane related feedback e.g., radio link control (RLC) status report, packet data convergence protocol (PDCP) status report (SR) etc.

For example, a WTRU may be configured to receive MBMS transmissions using unicast transmissions. For example, a WTRU may be configured to receive MBMS transmissions based on Single Cell Point-To-Multipoint (SC-PTM) transmissions. For example, a WTRU may be configured to receive MBMS transmissions via Single Frequency Network (SFN) transmissions. For example, the WTRU may be configured to receive multicast transmissions with at least one physical transmission attribute different than unicast transmission. For example, a WTRU may be configured to receive MBMS transmissions using non-unicast transmissions (e.g., the initial transmission for each data packet) as well as with unicast transmissions (e.g., for retransmissions and/or for uplink control and/or session information).

Methods for HARQ Processing for MBMS Systems

This section describes methods to support HARQ processing for MBMS services or, similarly, for a mDRB.

The methods stem from the principle whereby a device may acquire different layers of transmissions for a service using scheduling methods, configuration and/or parameters distinct for each layer to satisfy service requirements and/or device capabilities, as applied to HARQ processing herein. As used herein, HARQ "layers" or "layering" is a term used for the association or correlation of HARQ transmissions to WTRU scheduling configurations or other WTRU configuration related parameters that are useful in addressing improved data reception or received data reconstruction at the WTRU. In one example, layering may be an association or relationship with a WTRU scheduling configuration indexed as a sequence for a process, such as a HARQ process. Other relationships are possible in defining layers for a WTRU. Since "layering" may be defined differently for the different needs of different WTRUs, the term "layer" or "layering" is used to convey the various associations for WTRU scheduling configurations or other WTRU configuration related parameters that may be helpful for WTRU data reception in various environments; such as, for example, a MBMS environment.

Background on HARQ Processing

HARQ processing supports soft combining of all HARQ transmissions for a given transport block. Soft combining can be performed using Incremental Redundancy (IR) or Chase combining. With IR, each retransmission does not have to be identical to the original transmission. Instead, multiple sets of coded bits are generated, each representing the same set of information bits.

With Chase combining, the retransmissions consist of the same set of coded bits as the original transmission. As each retransmission is an identical copy of the original transmission, retransmissions with Chase combining acts as additional repetition coding. Therefore, as no new redundancy is transmitted, Chase combining does not give any additional coding gain but only increases the accumulated received Eb/No for each retransmission. Chase combining is a special case of incremental redundancy.

Baseline Scheduling Information for MBMS

A WTRU may be configured with one or more scheduling parameter(s) for the reception of downlink data. Such data may be associated with a MBMS service. Such data may be associated with a mDRB. Such data may be transmitted according to a transmission mode. For example, the WTRU may be configured with at least one of:
- one or more set(s) of control channel resources, such as PDCCH resources e.g., characterized by at least one of a CORESET, a search space, a periodicity, a DCI format and/or type, one or more aggregation levels, one or more control channel elements (CCE)s;
- one or more RNTI(s), such as an MBS-RNTI;
- a configuration for a transmission mode for reception of a MBMS service and/or for reception of data for a mDRB e.g., a configuration for unicast, multicast (e.g., SC-PTM), broadcast (e.g., SFN), or mixed-mode (WTRU can receive both unicast and at least one of multicast or broadcast).

The WTRU may have acquired the necessary configuration aspects by reception of application level information, for reception or system information, or from the reception of dedicated signaling that configured the MBMS service.

Baseline HARQ Processing for MBMS

The WTRU may be further configured with HARQ processing for a transmission mode associated with the MBMS service. The WTRU may be configured to perform HARQ processing (e.g., soft combining). The WTRU may be configured with one or more HARQ processes for the transmission mode. The WTRU may identify the applicable HARQ process for each transmission received e.g. on a PDSCH (or equivalent physical data channel for MBMS). The WTRU may be configured to determine whether the outcome of the soft-combining process has been successful or not.

Other, Generalized Applicability

The methods described herein are described in terms of HARQ processing, but similar procedures could be applied to application layer data such as media (e.g., audio, video, augmented reality, or similar) coded and/or structured in a layered manner.

For example, data can be encoded as layered video in terms of image resolution, cumulative additive (e.g., wavelet) coding, frame type, scene elements and composition, or the like.

For example, self-decoding (independent) I-frames could represent a first layer, (predictive) P-frames that require previous frames for decoding could represent a second layer, and (bi-directional) B-frames that require both previous and forward frames for decoding could represent a third layer for video delivery.

For example, augmented reality streams for scene composition could also be organized in layers.

Acquisition of different layers could be performed in relation to the capacity of the device e.g., in terms of processing, data rate, screen resolution, user preferences or the like.

Methods for HARQ Layering

In one method, the WTRU may be configured to perform soft combining of HARQ transmissions using a layering principle. For example, a layer may correspond to one HARQ transmission in the sequence of the HARQ processing for a given transport block. For example, the initial transmission for a given TB may correspond to transmission 0, and the first retransmission may correspond to transmission 1 in the sequence of the HARQ process, and so on. In one general example, a first TB transmission (transmission 0) may invoke a HARQ layer 0 process for an acknowledgement (ACK) or negative acknowledgement (NACK). If a NACK is produced, and a HARQ retransmission (transmission 1) is requested, the next instance of a HARQ process may be a HARQ layer 1 process that may be different than the HARQ layer 0 process. The different HARQ processes may be established as different configurations transmitted to the WTRU.

Device Applicability

The methods herein may be particularly useful for devices that are not configured with uplink transmissions. Such devices may include receive-only mode (ROM) devices, devices that have capability constraints, device that are already configured for uplink operation for unicast services but not managed as mixed-mode capable WTRU, or the like.

Layering for Sequencing of HARQ Transmissions.

Configuration of the HARQ Layers

A WTRU may be configured with one or more layer e.g. up to X layers. Such configuration may be received according to similar mechanisms as for other aspects of the MBMS service and/or be part of the configuration of the MBMS service. For example, the WTRU may receive a configuration for a MBMS service for a given MBMS area which includes HARQ layering configuration e.g., by reception of system information. For example, the WTRU may receive HARQ layering configuration in a SIB specific to MBMS service. For example, the WTRU may be configured to receive HARQ layering configuration using on-demand SIB.

The WTRU May Perform HARQ Processing/Soft Combining as a Function of Layers for HARQ Transmissions.

Soft Combining with Incremental Redundancy

For example, a layer may correspond to a specific HARQ redundancy version (RV) for soft combining using incremental redundancy (IR).

Soft Combining with Chase Combining

For example, a layer may correspond to additional retransmissions e.g. of the same coded bits for soft combining using chase combining.

The Method for Soft Combining May be a Configuration Aspect Per Service, Process ID, Layer, Etc.

For example, whether the HARQ process (e.g., all HARQ transmissions for a given TB) is using soft-combining or not, and if so whether it is using soft-combining with IR or Chase combining can be an aspect of the configuration of the transmission mode and/or of the MBMS service.

For example, whether the HARQ layer for one (or all) HARQ process(es) (e.g., for each different HARQ transmissions for a given TB) is to be soft-combined or not, and if so whether it should be soft-combined with IR or Chase combining can be an aspect of the configuration of the transmission mode, the MBMS service, the HARQ process and/or the HARQ layer. For example, such configuration aspect may be associated to a specific HARQ process identity (PID), or to a range thereof.

Scheduling and HARQ Layer Determination

The WTRU Acquires and/or Receives a HARQ Layer as a Function of Scheduling Configuration Aspect(s).

The WTRU may be configured with different scheduling parameters for the reception of each HARQ layer. As stated above, a HARQ layer may be based or defined to be associated with the scheduling configuration or scheduling parameter of a WTRU.

For example, the WTRU may be configured with one or more layers. The WTRU may be configured to associate a specific transmission to a given HARQ processing layer. A layer (and/or a range thereof) may be associated with one or more of the following:

- A PDCCH configuration: The WTRU may determine that a transmission for a given Process Identifier (PID) corresponds to a first layer if the WTRU successfully decodes a DCI using a first PDCCH configuration, and so on for other layers. More generally, PDCCH configuration(i) may correspond to HARQ transmission(i) in the sequence of the HARQ processing for a given HARQ process (or TB), where i may correspond to a single layer or to a range of layers e.g. from i=0 up to the maximum number of available (e.g., Y out of X) and/or configured (e.g., X) layers (e.g., Y−1 or X−1, respectively).
- A set of one or more CCEs: The WTRU may determine that a transmission for a given PID corresponds to a first layer if the WTRU successfully decodes a DCI using a first set of CCEs, and so on for other layers. More generally, a set of CCEs (i) may correspond to HARQ transmission(i) in the sequence of the HARQ processing for a given HARQ process (or TB), where i may correspond to a single layer or to a range of layers e.g. from i=0 up to the maximum number of available (e.g., Y out of X) and/or configured (e.g., X) layers (e.g., Y−1 or X−1, respectively).
- Index of the first control channel element (CCE) for the DCI: The WTRU may determine that a transmission for a given PID corresponds to a specific layer as a function of the starting index for the first DCI of a successfully decoded DCI. For example, the WTRU may determine that the transmission is for a first layer if the index is even, and for a second layer otherwise. For example, the WTRU may determine that the transmission is for a first layer if the index fulfills a specific mathematical relation e.g., using a modulo operation such as CCEindex mod(i)=0 where i is the layer bounded by the maximum number of available (e.g., Y out of X) and/or configured (e.g., X) layers (e.g., Y−1 or X−1, respectively) and CCEindex is the start index of the first CCE of the decoded DCI. Possibly, different layers may be configured with different mathematical relation such as to create ranges. More generally, the WTRU may determine from the start index of the first CCE of the successfully decoded DCI the corresponding HARQ transmission(i) in the sequence of the HARQ processing for a given HARQ process (or TB), where i may correspond to a single layer or to a range of layers e.g. from i=0 up to the maximum number of available (e.g., Y out of X) and/or configured (e.g., X) layers (e.g., Y−1 or X−1, respectively).
- A Control Resource Set (CORESET): The WTRU may determine that a transmission for a given PID corresponds to a first layer if the WTRU successfully decodes a DCI using a first CORESET, and so on for other layers. More generally, CORESET (i) may correspond to HARQ transmission(i) in the sequence of the HARQ processing for a given HARQ process (or TB), where i may correspond to a single layer or to a range of layers e.g. from i=0 up to the maximum number of available (e.g., Y out of X) and/or configured (e.g., X) layers (e.g., Y−1 or X−1, respectively).
- A search space: The WTRU may determine that a transmission for a given PID corresponds to a first layer if the WTRU successfully decodes a DCI using a first search space, and so on for other layers. More generally, search space (i) may correspond to HARQ transmission(i) in the sequence of the HARQ processing for a given HARQ process (or TB), where i may correspond to a single layer or to a range of layers e.g. from i=0 up to the maximum number of available (e.g., Y out of X) and/or configured (e.g., X) layers (e.g., Y−1 or X−1, respectively). For example, the common search space (CSS) may correspond to layer i=0 and the WTRU-specific search space (WTRUSS) may correspond to layer i=1 (and possibly above). In another example, a MBMS search space may be determined using a similar method as for the WTRUSS (using an identity of the WTRU) but using an identity associated to the MBMS service, session and/or area.
- A time/periodicity:
  The WTRU may determine that a transmission for a given PID corresponds to a first layer if the WTRU successfully decodes a DCI using a first decoding occasion and/or period in time, and so on for other layers using different decoding occasion and/or period in time. Such decoding occasion could be based on system frame number (e.g., as derived using a modulo operation), timing related to control channel aspects such as CORESET periodicity, DRX On-duration or similarly derived sets of occasions. Possibly, the WTRU may use a similar method as for paging occasions derived based on the WTRU's identity but instead using an identity associated to the MBMS service, session and/or area.

In one method, the DCI may additionally include the period between each PDCCH occasion for each layer starting from time of reception of the DCI for the initial HARQ transmission for this HARQ process. For example, the WTRU may receive a DCI for the initial transmission of a TB for HARQ PID=X0 at time t=t1, which DCI may include an inter-layer scheduling of period. Tperiod may be expressed in any time unit e.g. in terms of one or more symbol(s), slot(s), sub-slot(s), subframe, us, ms or the like. The WTRU may use then determine all possible scheduling occasions for all retransmissions in the sequence for a given HARQ process as occurring every Tperiod starting from time t1 for the total number of layers available (e.g., Y out of X) and/or configured (e.g., X). Transmission 0 thus occurs at time t1, transmission 1 at time t1+Tperiod and more generally transmission X would occur at time t1+X*Tperiod. In another method, Tperiod may be a configuration aspect of the WTRU.
- A RNTI: The WTRU may determine that a transmission for a given PID corresponds to a first layer if the WTRU successfully decodes a DCI using a first RNTI, and so on for other layers. More generally, RNTI (i) may correspond to HARQ transmission(i) in the sequence of the HARQ processing for a given HARQ process (or TB), where i may correspond to a single layer or to a range of layers e.g. from i=0 up to the maximum number of available (e.g., Y out of X) and/or configured (e.g., X) layers (e.g., Y−1 or X−1, respectively). For example, the common MBS-RNTI may correspond to layer i=0 and the WTRU-specific C-RNTI may correspond to layer i=1 (and possibly above).

The resources scheduled for the transmission (e.g., on PDSCH): The WTRU may determine that a transmission for a given PID corresponds to a first layer if the WTRU successfully decodes a DCI that indicates a first set of resources for the scheduled transmission, and so on for other layers. More generally, the set of scheduled (e.g., PDSCH) resources (i) may correspond to HARQ transmission(i) in the sequence of the HARQ processing for a given HARQ process (or TB), where i may correspond to a single layer or to a range of layers e.g. from i=0 up to the maximum number of available (e.g., Y out of X) and/or configured (e.g., X) layers (e.g., Y−1 or X−1, respectively). For example, a set of resources may correspond to the physical resource blocks (PRBs) scheduled for the transmission within the DCI format. For example, a set of resources may correspond to the bandwidth part (BWP) associated with the scheduled transmission for the concerned DCI e.g., if a modelling based on BWPs is used to indicate HARQ layers for a given cell and/or across multiple cells of the WTRU's configuration (e.g., in case of aggregation). For example, a set of resources may correspond to the cell identity associated with the scheduled transmission for the concerned DCI e.g., if a modelling based on cells is used to indicate HARQ layers either within a given cell as a logical construct and/or across multiple cells of the WTRU's configuration (e.g., in case of aggregation). For example, a set of resources may correspond to the CG associated with the scheduled transmission for the concerned DCI e.g., if a modelling based on cell groups is used to indicate HARQ layers for a MBMS area and/or across multiple cells of the WTRU's configuration (e.g., in case of dual connectivity and/or aggregation).

A DCI format/size: The WTRU may determine that a transmission for a given PID corresponds to a first layer if the WTRU successfully decodes a DCI using a first DCI format, and so on for other layers. More generally, DCI format (i) may correspond to HARQ transmission (i) in the sequence of the HARQ processing for a given HARQ process (or TB), where i may correspond to a single layer or to a range of layers e.g. from i=0 up to the maximum number of available (e.g., Y out of X) and/or configured (e.g., X) layers (e.g., Y−1 or X−1, respectively).

One, or a range of, Aggregation Levels (AL): The WTRU may determine that a transmission for a given PID corresponds to a first layer if the WTRU successfully decodes a DCI using a first AL, and so on for other layers. More generally, AL (i) (or multiple values thereof e.g. [4, 16] for i=0, [2, 8] for i=1) may correspond to HARQ transmission(i) in the sequence of the HARQ processing for a given HARQ process (or TB), where i may correspond to a single layer or to a range of layers e.g. from i=0 up to the maximum number of available (e.g., Y out of X) and/or configured (e.g., X) layers (e.g., Y−1 or X−1, respectively). This may be applicable for Chase combining.

Same or Different Methods May be Used for Initial Transmissions, and for Retransmissions Possibly, the WTRU receives the initial HARQ transmission (e.g., transmission 0) according to a first configuration aspect/scheduling parameter (e.g. by receiving DCIs on a first PDCCH), and subsequent HARQ retransmissions according to a second configuration aspect/scheduling parameter (e.g. by receiving DCIs on a second PDCCH) in combination with another of the above aspects. For example, the WTRU may determine a layer of each HARQ retransmissions for the given HARQ process on the second PDCCH using different RNTIs e.g., MBMS-R-RNTI_1 (e.g., for transmission 1) and so on up to MBMS-R-RNTI_X (e.g., transmission X).

Determination of Available HARQ Layering.

Dynamic Change in the Number of Available Layers e.g., Y Available Out of X Configured In one method, the WTRU may receive dynamic indications of the number of layers available for the MBMS service. For example, the WTRU may receive such indication in the control information (e.g., DCI) for the scheduling of the initial transmission for a given TB (e.g., transmission 0). For example, the WTRU may receive an indication of the number of layers available e.g. Y out of X configured layers. Such indication may be applicable for the concerned HARQ process (e.g., for the transmission of the TB), or for all HARQ processes (e.g. for the transmission of all TBs associated to the service). Such indication may be valid for a given period. Such period may be a configuration aspect of the WTRU or may be included in the DCI that indicates the number of available layer(s). In one example, the indication signals the total available layer(s) for the HARQ processing. In another example, the indication signals the total number of retransmissions for the concerned HARQ processing.

Blind Decoding Activity for a Given Layer as a Function of the Outcome of Another Layer The WTRU may perform blind decoding for a first layer. The WTRU may start blind decoding for a second layer upon successful blind decoding of a DCI for the first layer. For example, the first layer may correspond to the initial transmission for a given HARQ process (e.g., transmission 0). The second layer may correspond to the first retransmission (e.g., transmission 1). In one alternative, a similar relationship may exist between all layers configured for retransmissions e.g. between the layer for HARQ retransmission i and the layer for HARQ retransmission i+1. In another alternative, any layer configured for HARQ retransmissions may be handling as the second layer e.g. the WTRU may start blind decoding activity for all available and/or configured layers for HARQ retransmissions upon successful blind decoding of an initial transmission for a given HARQ process. Such blind decoding processing may be further referred to as hierarchical decoding of HARQ layers. Possibly, a layer may be configured with a maximum time during which a transmission for the concerned layer may occur e.g., starting from the time of the reception of the DCI for the initial transmission and/or from the reception of the initial transmission, for a HARQ process. For example, the WTRU may start (or restart) a timer maxBlindDecodingTime when it receives a DCI that schedules a new TB for a given HARQ process configured for HARQ layering operation. Possibly, the start value of maxBlindDecodingTime may correspond to the value of the maximum time configured for the available layer with the highest transmission index, the maximum time configured for the configurable layer with the highest transmission index and/or the maximum time configured for the layer with the highest transmission index that the WTRU is currently monitoring e.g., as target HARQ operating point. A target HARQ operating point may be the desired number of HARQ transmissions for a TB and/or the number of layers (e.g. HARQ layers) that may be necessary to meet the desired service requirements.

Activation/Deactivation of HARQ Layers
WTRU-Autonomous Acquisition/Activation of HARQ Layers A WTRU may acquire the configuration for a MBMS service, e.g. using system information broadcast. The WTRU may determine that HARQ layering is available for the given service. The WTRU may start blind decoding of the first layer for initial HARQ transmissions for the service. The WTRU may further autonomously determine whether to initiate blind decoding for additional layers and, if so, for how many. For example, the WTRU may initially perform blind decoding for all available layers of its configuration. Possibly, only if there is at least one HARQ process that has not successfully completed. Possibly, only up to the maximum blind decoding time for the layer with the highest transmission index that the WTRU is monitoring e.g., corresponding to maxBlindDecodingTime (or equivalent).

The WTRU may autonomously and dynamically determine that it should attempt receiving the layer that correspond to the next HARQ transmission in the sequence as a function of the outcome of the last soft-combining attempt for a given HARQ process. Alternatively, the WTRU may autonomously determine the number of layers to receive as a function of the observed operating point (e.g., the target number of HARQ transmissions for a TB) e.g., such as based on an average number of HARQ transmission(s) necessary to successfully decode a certain percentage (e.g., 95%) of the transmissions and/or to achieve a certain PLR for the service. Such target operating point, percentage and/or Packet Loss Rate (PLR) may be a configuration aspect of the service. In one example, an observed HARQ operating point may be the observed or currently occurring number of HARQ transmissions for a TB and/or the number of layers (e.g. HARQ layers) that may be necessary to meet the desired service requirements.

Network Controlled (NW-Controlled) Activation/Deactivation of HARQ Layers

A WTRU may receive configuration and/or signaling that indicates what layer to activate and/or to deactivate. For example, such signaling may correspond to L3/RRC signaling, to L2 signaling e.g., a MAC CE or to L1 signaling e.g., using a DCI on PDCCH. Such signaling may include an indication of the number of layers, or the identity of the layer for the last transmission in the sequence of HARQ transmission for a process.

For example, the WTRU may receive a DCI with an explicit indication to activate and/or to deactivate one or more layers e.g., the DCI may include a bitmap indicating the activation status for the layers. The WTRU may further determine the sequence in the HARQ processing as a function of the activated layers in the bitmap e.g., the bitmap may refer to a plurality of indexed HARQ layer configurations (e.g., scheduling parameters) and the WTRU may determine the applicable sequence for the layer in the HARQ processing from the sequence in the bitmap. For example, a bitmap that indicates that layer configuration 0, 3 and 5 are activated would further indicate that configuration 0 is for the initial transmission (or first retransmission) of a given TB and subsequently HARQ should process transmissions using configuration 3 and then 5 sequentially.

For example, the WTRU may receive a DCI with a zero-size grant for a given layer. The WTRU may determine that the corresponding layer is deactivated e.g., possibly until the WTRU determines that the layer is activated using another method as described above. Possibly, the WTRU determines from such signaling that other layers corresponding to subsequent transmissions in the sequence of HARQ processing are also deactivated.

Methods for HARQ with Support for Uplink Control Information (UCI)

The WTRU may be configured for reception of an MBMS service e.g., with mixed-mode transmission. The WTRU may be configured with a resource for transmission of UCI e.g., on PUCCH. The WTRU may be in CONNECTED mode. The WTRU may have valid uplink timing advance (e.g., the TA timer is running) for the PUCCH resource configured for MBMS.

The WTRU may determine that HARQ decoding for a given PID for a given transmission using MBMS scheduling configuration (e.g., MBMS-RNTI) is unsuccessful. The WTRU may select a PUCCH resource for transmission of UCI that indicates NACK. In one example, the resource WTRU may determine the resource as a function of a WTRU-specific configuration. In another example, the WTRU may determine the resource dynamically e.g., based on characteristic of the DCI that scheduled the initial transmissions (e.g., start index of the first CCE of the DCI).

Non-Unicast Initial Transmissions, Unicast UCI, Unicast Retransmissions—No Layering Needed In one method, the WTRU may further monitor for a DCI for a dedicated retransmission e.g., using C-RNTI. The WTRU may successfully decode a DCI that indicates a retransmission for the concerned PID and perform HARQ soft combining. If the WTRU determines that the transmission is unsuccessful, it may indicate NACK similarly as for the previous transmission. The WTRU may be configured with a maximum number of HARQ transmission for MBMS (DL HARQ). The WTRU may refrain from sending any UCI if it determines that the maximum number of HARQ transmission has been reached for the PD.

Non-Unicast Initial Transmissions, Unicast UCI, Non-Unicast Retransmission Based on Layers In another method, the WTRU may instead start attempting to receive the next layer after transmission of UCI for NACK e.g., using similar methods as described above for HARQ layering. The WTRU may subsequently attempt receiving from the next layer if the HARQ process is unsuccessful, possibly up to a maximum number of layers, attempt and/or time as described in the previous sections.

Configuration and/or applicability of HARQ feedback may be a configuration aspect of the WTRU e.g., for a given service and/or transmission mode. The configuration of HARQ feedback may be applied per layer, per group of layers or for all layers e.g. for zero, one or more layers.

Methods for Failure Handling for HARQ Processing
Possibly, the WTRU May be Configured to Indicate MBMS Link Problems to Upper Layers The WTRU may be configured to indicate MBMS radio link problems and/or failure to upper layers. The WTRU may determine that there is a radio link problem when a HARQ process is unsuccessful, e.g., the WTRU has no further means to receive a retransmission and/or a maximum number of HARQ transmissions opportunities has been reached and/or a maximum time has elapsed since the initial transmission for the HARQ process. The WTRU may possibly take further recovery actions e.g., such as initiating a request for L2 retransmission, initiating a procedure that aims to change the transmission mode, initiating a procedure that may lead to a mobility event (e.g., conditional handover or similar), or initiating a procedure that signals information related to HARQ processing such as described below.

The WTRU may determine MBMS radio link problems using a threshold based on a similar procedure as the in-synch/out-synch procedure for Uu RLM, where e.g., the in-synch is the number of HARQ processes that are successful, and out-synch is the occurrence of a HARQ process that is unsuccessful for a given MBMS service. Thresholds may be a configuration aspect of the WTRU.

Possibly, the WTRU May be Configured to Indicate Target/Observed HARQ Operating Point The WTRU may be configured to send uplink control information (UCI) that indicates additional information related to HARQ processing such as e.g., target HARQ operating point, observed HARQ operating point and/or corresponding to the number of layers that may be necessary to meet the service requirements. The WTRU may transmit such information using UCI over PUCCH, using a MAC CE or using L3/RRC signaling. The WTRU may trigger such signaling upon detecting a unit change in the number of HARQ transmission according to the applicable metric. The WTRU may be configured with a prohibit timer, which timer it may start upon including and/or transmitting the signaling, and refrain from sending any such signaling while the timer is running. Possibly, the WTRU may be configured to transmit such information periodically e.g., such that it may also act as a keep-alive. This may be useful for the network to determine how many layers to activate for a given service, and/or to determine most optimal transmission mode configuration for a given MBMS area.

Exemplary Procedure for HARQ Processing

In one example procedure, the WTRU may perform at least one of the following steps for HARQ processing e.g., for non-unicast, sidelink and/or for mixed-mode transmissions:

The WTRU may support HARQ processing e.g., organized as layers related to HARQ sequencing and e.g., for an MBMS service and/or mDRB and/or mSRB and/or for a given transmission mode, including layering and scheduling aspects using one or more methods as described in section addressing Methods for HARQ Layering above;

The WTRU may receive a HARQ configuration for a transmission mode, including one or more of e.g., a type of soft combining, a number of HARQ layer(s), support for uplink UCI e.g., HARQ feedback, configuration of the method for uplink transmissions (if applicable), scheduling parameters using one or more methods as described in section Layering for sequencing of HARQ transmissions above;

The WTRU may be configured with up to X HARQ layers, where each layer may be associated with a scheduling configuration. The WTRU may determine how to receive and identify a HARQ transmission in a sequence for a given TB (e.g., for a given PID) according to the scheduling configuration for the HARQ layer, according to one or more methods described in section Scheduling and HARQ layer determination above;

The WTRU may receive control scheduling for a given HARQ process by performing blind decoding of a control channel, according to one of the methods described in section Determination of available HARQ layering above;

Possibly, the WTRU may dynamically determine how many layers are available using at least one of the implicit methods described in section Activation/Deactivation of HARQ layers above. This may be applicable if the network does not perform a transmission for all layers of the configuration e.g., to maximize use of resources, and only transmit according to service requirements.

Possibly, the WTRU may dynamically determine how many layers are available using at least one of the explicit methods described in section Activation/Deactivation of HARQ layers above. The WTRU may receive explicit signaling that modifies in a semi-static manner the number of layers available for the WTRU's determination. This may be useful to help the WTRU to minimize its blind decoding complexity, compared to implicit methods. This may be applicable if the network does not perform a transmission for all layers of the configuration e.g., to maximize use of resources, and only transmit according to service requirements.

Possibly, the WTRU may be configured with uplink resources for transmission of HARQ feedback. The WTRU may transmit HARQ feedback for a given layer e.g., using at least one of the methods described in section Methods for HARQ with Support for UCI above.

Possibly, the WTRU may perform failure handling for HARQ processing according to at least one of the methods described in section Methods for Failure Handling for HARQ processing above when e.g., the WTRU has been unsuccessful to decode the TB for the last available layer for the HARQ PD.

Methods for L2 Retransmissions for MBMS Systems

The WTRU may be configured for reception of an MBMS service. The WTRU may be configured such that it may perform sparse uplink transmissions e.g., the WTRU may be configured with mixed-mode transmission in RRC CONNECTED mode and/or the WTRU may support small data transmissions in RRC IDLE mode and/or RRC INACTIVE mode without requiring a transition to RRC CONNECTED mode, and/or the WTRU may support small data transmissions in RRC CONNECTED mode.

MBMS Status Report

The WTRU may determine that HARQ decoding for a given PID for a given transmission using MBMS scheduling configuration (e.g., MBMS-RNTI) is unsuccessful. The WTRU may initiate an uplink transmission that includes information related to the reception status of a given MBMS service, including mDRB status if applicable. Such information may be hereafter referred to as MBMS Status Report (MSR).

Format and/or Content of the MSR

The WTRU is assumed to have means to identify a service data unit (SDU) (e.g., an IP packet) within a sequence of received PDUs for the MBMS services. For example, each PDU for a given mDRB may be associated with a Sequence Number (SN). Such SN may correspond to a PDCP SN, if PDCP is configured for the mDRB. Alternatively, sequencing information may be introduced in MAC for MBMS. In such case, the sequencing information may be applied per MBMS service.

The MSR may indicate and/or include one or more of the following information:

A request for the retransmission of one or more SDUs for the MBMS service;

An identity for the MBMS service and/or session (MBMS ID) e.g., an identity that can uniquely identify a flow of data for a MBMS service;

An identity for validation that the WTRU as permission to access the MBMS service, possibly a WTRU-specific access token (WTRU MBMS ID). Such token may uniquely identify a WTRU, a WTRU context and/or a MBMS service;

A mDRB identity, if configured for the MBMS service;

Sequencing information describing receive buffer status in terms e.g. IP packets for the MBMS ID, such as at least one of;
a. Acknowledgement of non-consecutive SDUs e.g., within a window of time and/or number of SDUs e.g., using
A Last Received In-Sequence Sequence Number (SN)—LRSN. This may be useful for the network implementing only cumulative retransmissions for MBMS, e.g. using non-unicast transmissions; or
b. A First Missing SN PDU (SN)—FMS; and
A bitmap of reception status for subsequent SN. The bitmap may be of variable length, depending on whether there is a least one out-of-sequence PDU in the WTRU's buffer for the MBMS service. The length of the bitmap may be limited in number of missing PDUs (depth in number of PDUs) and/or in terms of time (latency restrictions). This may be useful for the network implementing selective retransmissions for MBMS, e.g. using unicast transmissions;

Support May be a WTRU Configuration Aspect, e.g., Per MBMS Service, Per mDRB, Per Transmission Mode Support of the MSR for a given MBMS service and/or area may be a configuration aspect of the WTRU. The format of the MSR (e.g., for cumulative only, for cumulative and/or selective retransmissions) may also be a configuration aspect of the WTRU.

Triggers for MBMS Status Report

The WTRU may initiate transmission of an MSR when it determines at least one of the following:
The WTRU determines that there is at least one PDU missing in the sequence of PDUs e.g., for a given MBMS service, MBMS ID and/or mDRB (if configured);
a. Possibly, within a receive window of a configurable size (in units of SDUs, and/or in time);
The WTRU determines that the transmission of a TB has failed for a given HARQ process;
The WTRU determines that it experiences MBMS link problems;
The WTRU reconfigures its transmission mode for MBMS service to a mode that support L2 retransmissions;
The WTRU performs a mobility-related reconfiguration and initiates access in a target cell;
The WTRU performs a mobility-related reconfiguration that changes the MBMS area and initiates access in a target cell;
The WTRU is configured with service continuity and/or lossless operation for the MBMS service.

Exemplary Trigger Using a Combination of the Above

For example, the WTRU may initiate the transmission of an MSR e.g., upon a mobility even within the same MBMS area, which mobility event reconfigures the WTRU's transmission mode from broadcast-only to mixed-mode operation and the WTRU determines that there is at least one PDU missing in the sequence of PDUs for a given MBMS ID from the reception of data associated to the mDRB in the target cell. The WTRU may then perform the transmission of the MSR using the applicable (possibly configured) resource e.g., MSR over PUSCH, MSR over PUCCH or MSR using physical random access channel (PRACH) resources.

Exemplary Prioritization and/or Selection of Transmission Resource for MSR

For example, the WTRU may first perform the transmission of the MSR by selecting a PUSCH resource if such is available (from dynamic scheduling or from semi-static configuration) e.g., in the same period (e.g., TTI, subframe, or the likes) as when the WTRU triggers MSR, otherwise it may select a PUCCH resource (if configured, valid and/or available), otherwise the WTRU may then perform a procedure to acquire a PUSCH resource e.g., using the Scheduling Request procedure or by initiating a small data transfer using PRACH resources or similar, otherwise the WTRU may then perform the transmission of MSR using PRACH resources.

Exemplary Procedure for MSR Transmission e.g., Using MSR Over Physical Uplink Shared Channel (PUSCH)

In one method, the WTRU may initiate the transmission of an MSR using a PUSCH resource. In such case, the WTRU may trigger a SR when it determines that the MSR should be transmitted, possibly only if the WTRU does not have a resource available for the transmission of the MSR. The WTRU may perform the transmission of the MSR over e.g., PUSCH using a semi-static (e.g., configured) grant, a dynamic grant and/or using a small data transfer procedure e.g., using 2-steps or 4-steps RACH for small data transmissions. For example, the MSR may be included in the transmission of a TB using a MAC CE e.g., a MAC MSR CE. For example, the MSR may be included in the transmission of a TB using a PDCP control message e.g., a PDCP MSR.

The WTRU may then perform the steps for reception of L2 retransmissions.

Exemplary Procedure for MSR Transmission e.g., Using MSR Over Physical Uplink Control Channel (PUCCH)

In one method, the WTRU may perform the transmission of the MSR using a PUCCH resource. Such resource may be valid (e.g., available) for a WTRU in CONNECTED mode and/or when the WTRU has valid uplink timing alignment.

The WTRU may be further configured with at least one of the following:
A receive window; the receive window may be associated with a specific MBMS service, MBMS ID and/or mDRB. The window may be expressed in units of SDUs e.g. in terms of the number of SDUs since the last received SDU based on the sequencing information of the service (e.g., SN), or it may be expressed in units of time.
A PUCCH resource for MSR; the resource may be associated with a specific MBMS service, MBMS ID and/or mDRB.

For example, The WTRU may determine that an MSR transmission should be performed e.g., if the WTRU determines that at least one SDU is missing in the moving window. The WTRU may perform the transmission of an MSR on PUCCH e.g., in a similar manner to the transmission of the Scheduling Request—SR on PUCCH for unicast transmissions.

The WTRU may then perform the steps for reception of L2 retransmissions.

Exemplary Procedure for MSR Transmission e.g., Using MSR Over Physical Random Access Channel (PRACH)

In one method, the WTRU may perform the transmission of the MSR using a PRACH resource.

The WTRU may be further configured with at least one of the following:
A receive window; the receive window may be associated with a specific MBMS service, MBMS ID and/or mDRB. The window may be expressed in units of SDUs e.g. in terms of the number of SDUs since the last received SDU based on the sequencing information of the service (e.g., SN), or it may be expressed in units of time.

A preamble for MSR; the preamble may be associated with a specific MBMS service, MBMS ID and/or mDRB. For example, this may be applicable if the WTRU uses PRACH resources that are not dedicated to the MBMS service.

A PRACH resource for MSR; the resource may be associated with a specific MBMS service, MBMS ID and/or mDRB. For example, this may be applicable if the WTRU uses PRACH resources that are not dedicated to the MBMS service, or otherwise if the PRACH resources are dedicated to the MBMS L2 retransmissions procedure while the preambles are associated with a specific MBMS ID.

For example, The WTRU may determine that an MSR transmission should be performed e.g., if the WTRU determines that at least one SDU is missing in the moving window. The WTRU may perform the transmission of an MSR on the PRACH resources associated with the MBMS services, possibly by selecting a preamble that is associated with the MBMS ID and/or mDRB for which the MSR was triggered and/or initiated.

The WTRU may then perform the steps for reception of L2 retransmissions.

Exemplary Procedure for Reception of L2 Retransmissions Start of Supervision Function The WTRU may start a timer Tflush upon transmission of the MSR. When the timer expires, it may release all PDUs including out-of-order PDUs to upper layer and set the last in-sequence received SN to the last received PDU. The WTRU may stop the timer Tflush when it receives all missing PDUs in-sequence.

Non-Unicast Initial Transmissions, Unicast MSR, Unicast Retransmissions—No Layering Needed In one method, the WTRU may monitor for a DCI for a dedicated retransmission e.g., using C-RNTI, subsequently to the transmission of an MSR. The WTRU may successfully decode a DCI and receive data for the MBMS service. The WTRU detects and discards duplicates (e.g., in case of cumulative retransmissions) if applicable, and release the in-sequence PDUs (e.g., in either case of cumulative or selective retransmissions).

Non-Unicast Initial Transmissions, Unicast MSR, Non-Unicast Retransmission Based on Layers In another method, the WTRU may be configured with a layer for SDU retransmissions. This may be instead or in addition to HARQ layers. The WTRU may instead start attempting to receive the next layer after transmission of an MSR e.g., using similar methods to receive a layer of PDU retransmissions as described above for reception of HARQ retransmission using HARQ layering. The WTRU may attempt receiving from the PDU retransmission layer for a given, possibly configured, period. Such period may correspond to the timer Tflush above.

The WTRU may determine that the PDU retransmissions is unsuccessful, e.g. when the timer Tflush expires.

Failure Handling for Unsuccessful L2 Retransmission Procedure

Possibly, the WTRU May be Configured to Indicate MBMS Link Problems to Upper Layers The WTRU may be configured to indicate MBMS radio link problems and/or failure to upper layers. The WTRU may determine that there is a radio link problem if e.g., timer Tflush expires, and/or there are still missing PDUs after a certain period following the transmission of the MSR. The WTRU may then take further recovery actions e.g., such as initiating a procedure that aims to change the transmission mode, initiating a procedure that may lead to a mobility event (e.g., conditional handover or similar), or initiating a procedure that signals information related to HARQ processing such as described below.

The WTRU may determine MBMS radio link problems using a threshold based on a similar procedure as the in-synch/out-synch procedure for Uu RLM, where e.g., the in-synch is the number of transmissions received while there is no outstanding out-or-order PDUs and out-synch is the occurrence of out-of-order PDUs for a given MBMS service. Thresholds may be a configuration aspect of the WTRU.

Exemplary Procedure for L2 Retransmissions—Baseline

In one example procedure, the WTRU may perform at least one of the following steps for supporting L2 retransmissions e.g., for non-unicast, sidelink and/or for mixed-mode transmissions:

The WTRU may support L2 retransmissions processing for an MBMS service and/or mDRB and/or mSRB and/or for a given transmission mode, including scheduling aspects using one or more methods as described in section Methods for L2 Transmissions for MBMS Systems above;

The WTRU may receive a configuration for L2 retransmissions e.g., for a transmission mode, including one or more of e.g., a type of retransmission (selective, cumulative) and/or whether or not the WTRU should apply reordering and/or duplicate detection, configuration of the method for uplink transmissions (if applicable) to transmit the MSR (e.g., using PUCCH, PUSCH, PRACH and/or small data transmissions), what resources to use for transmission of MSR (if applicable), scheduling parameters using one or more methods described in section Methods for L2 Transmissions for MBMS Systems Above;

The WTRU may determine that it should transmit an MSR according to at least one of the triggers described in sections MBMS Status Report, Triggers for MBMS Status Report above.

The WTRU may transmit the MSR according to one of the possible formats described in section MBMS Status Report above;

The WTRU may transmit the MSR using at least one of the methods described in sections MBMS Status Report, Triggers for MBMS Status Report, Exemplary procedure for MSR transmission e.g., using MSR over PUSCH, Exemplary procedure for MSR transmission e.g., using MSR over PUCCH, and/or Exemplary procedure for MSR transmission e.g., using MSR over PRACH above.

The WTRU may perform reception of L2 retransmissions using at least one of the methods described in section Exemplary procedure for reception of L2 retransmissions above.

Possibly, the WTRU may perform failure handling for L2 retransmissions according to at least one of the methods described in section Failure Handling for unsuccessful L2 retransmission procedure above when e.g., the WTRU has been unsuccessful to receive one or more data units in-sequence e.g., when at least one L2 retransmission layer was available and/or after a period following the transmission of the MSR.

Exemplary Procedure for L2 Retransmissions—Layered Approach

In one example procedure, the WTRU may perform at least one of the following steps for supporting L2 retransmissions using layering e.g., for non-unicast, sidelink and/or for mixed-mode transmissions:

- The WTRU may support L2 retransmissions e.g., organized as layers where a first layer may correspond to the initial transmission of a TB and a second layer may correspond to a L2 retransmission for the TB. The WTRU may receive a configuration for each layer for a given MBMS service and/or mDRB and/or mSRB and/or for a given transmission mode, including layering and scheduling aspects using one or more methods similar as those described for HARQ layering in section Methods for HARQ layering above and its subsections;
- The WTRU may receive a L2 retransmission configuration e.g., for a transmission mode, including one or more of e.g., a type of retransmission (selective, cumulative) and/or whether or not the WTRU should apply reordering and/or duplicate detection, a number of retransmission layer(s), support for uplink transmission e.g. MSR, configuration of the method for uplink transmissions (if applicable) to transmit the MSR (e.g., using PUCCH, PUSCH, PRACH and/or small data transmissions), what resources to use for transmission of MSR (if applicable), scheduling parameters for the layer using one or more methods similar as those described in section Layering for sequencing of HARQ transmissions above;
- The WTRU may be configured with up to X HARQ layers, where each layer may be associated with a scheduling configuration. The WTRU may determine how to receive a L2 transmission for a given service, mDRB, sDRB according to the scheduling configuration for the layer and identify a given PUD/SDU in the sequence for data units for the flow, using one or more methods similar as those described in section Scheduling and HARQ layer determination above;
- The WTRU may receive control scheduling for a given L2 retransmission by performing blind decoding of a control channel, according to one of the methods similar as those described in section Determination of available HARQ layering above;
- Possibly, the WTRU may dynamically determine how many layers are available using at least one of the implicit methods similar as those described in section Activation/Deactivation of HARQ layers above. This may be applicable if the network does not perform L2 retransmissions for a given layer for all data units e.g., to maximize use of resources, and only transmit according to service requirements.
- Possibly, the WTRU may dynamically determine how many layers are available using at least one of the explicit methods similar as those described in section Activation/Deactivation of HARQ layers above. The WTRU may receive explicit signaling that modifies in a semi-static manner the number of layers available (and/or turn on/off L2 retransmissions) for the WTRU's determination. This may be useful to help the WTRU to minimize its blind decoding complexity, compared to implicit methods. This may be applicable if the network does not perform L2 retransmissions for a given layer for all data units e.g., to maximize use of resources, and only transmit according to service requirements.
- Possibly, the WTRU may determine that it should transmit an MSR according to at least one of the triggers described in sections MBMS Status Report, Triggers for MBMS Status Report above.
- Possibly, the WTRU may transmit MSR using at least one of the methods described in sections MBMS Status Report, Triggers for MBMS Status Report, Exemplary procedure for MSR transmission e.g., using MSR over PUSCH, Exemplary procedure for MSR transmission e.g., using MSR over PUCCH, and/or Exemplary procedure for MSR transmission e.g., using MSR over PRACH above.

The WTRU may perform reception of L2 retransmissions using at least one of the methods described in section Exemplary procedure for reception of L2 retransmissions above.

Possibly, the WTRU may perform failure handling for L2 retransmissions according to at least one of the methods described in section Failure Handling for unsuccessful L2 retransmission procedure above when e.g., the WTRU has been unsuccessful to receive one or more data units in-sequence e.g., when at least one L2 retransmission layer was available and/or after a period following the transmission of the MSR.

Methods for Service Continuity and Mobility

This section describes enablers for monitoring (e.g., radio link monitoring), detection (e.g., declaration of MBMS problems) and recovery for the MBMS service in support of different MBMS modes/reliability.

The WTRU may be configured to perform supervision of the MBMS service in terms of monitoring data reception and/or in terms of support for the necessary mechanism for meeting the necessary data reception target e.g., in terms of meeting a packet loss rate (PLR) target with or without L2 retransmissions, in terms of meeting a latency requirement and/or in terms of availability/reception of a sufficient number of HARQ layers. The monitoring function may be specific to a given MBMS service, transmission mode, mDRB configuration and/or RRC connectivity mode (e.g., IDLE, CONNECTED or INACTIVE).

Connectivity and Service Supervision

The WTRU may monitor the MBMS service to determine if there are problems with the MBMS connectivity and/or radio link. Such methods may be based on other error determination described herein.

Change of Transmission Mode

The WTRU may be configured and/or acquire the configuration for MBMS service(s) in a given set of resources and/or area e.g., a BWP, a cell, a group of cells, an MBMS area and/or an area for the INACTIVE state.

The WTRU may initiate a change of transmission mode upon at least one of the following:

The WTRU is in CONNECTED mode and receives an RRC reconfiguration message:
- a. RRC reconfigures one or more aspects of the WTRU's configuration (possibly excluding the WTRU's MBMS configuration); and
- b. The WTRU determines that by complying with the reconfiguration, the WTRU's capability (e.g., its MBMS-related capabilities) would be exceeded with the current MBMS transmission mode;
  Such capability may correspond to capabilities described above.

The WTRU is in CONNECTED mode and receives an RRC reconfiguration message without mobility control, and at least one of the following occurs:
- a. RRC reconfigures the WTRU's transmission mode for MBMS:
- b. RRC reconfigures at least one of the WTRU's mDRB:
- c. The WTRU performs the reconfiguration procedure but fails to access the primary cell of the secondary cell group (SCG) (e.g., T304 expires for the SCG);

The WTRU is in CONNECTED mode and receives an RRC reconfiguration message with mobility control (e.g., indicating a change of target cell), and at least one of the following occurs:
  a. RRC does not explicitly reconfigure the WTRU's transmission mode for MBMS;
  b. The WTRU's configuration for unicast transmission for MBMS services and/or mDRB is no longer applicable;
  c. The WTRU performs the mobility procedure but fails to access the target cell (e.g., T304 expires);
  d. The reconfiguration is for an inter-RAT HO;
The WTRU is in CONNECTED mode and determine that RLF has occurred and/or the WTRU starts T310;
The WTRU is in CONNECTED mode and determine that the connection re-establishment procedure has failed (e.g., T310 expires);
The WTRU is in IDLE mode, and:
  a. The WTRU performs cell reselection that indicates a different cell for camping;
    And the WTRU determines that the cell does not support the current transmission mode for the ongoing MBMS service; or
    And the WTRU determines that the cell belongs to a different MBMS area, in which the ongoing MBMS service is available. Different areas may not support service continuity in terms of transmission mode;
  b. The WTRU performs tracking area update (TAU) procedure, e.g. due to a change in area;
  c. The WTRU determines that the cell has a different support for, and configuration of, uplink resources for MBMS-related transmissions e.g., small data transmissions, PRACH resources and/or preambles for MSR.
The WTRU is in INACTIVE mode, and:
  a. The WTRU performs cell reselection that indicates a different cell for camping;
    And the WTRU determines that the cell does not support the current transmission mode for the ongoing MBMS service; or
    And the WTRU determines that the cell belongs to a different MBMS area, in which the ongoing MBMS service is available. Different areas may not support service continuity in terms of transmission mode;
  b. The WTRU determines that the cell belongs to a different area for the purpose if INACTIVE state.
  c. The WTRU determines that the cell has a different support for, and configuration of, uplink resources for MBMS-related transmissions e.g., small data transmissions, PRACH resources and/or preambles for MSR.
The WTRU performs a transition to the CONNECTED mode, and
  a. RRC reconfigures the transmission mode. The reconfiguration may indicate whether L2 retransmission are supported for the MBMS service, configuration and/or mDRB.
The WTRU performs a transition to the IDLE mode, and
  a. The WTRU's configuration for unicast transmission for MBMS services and/or mDRB is no longer applicable;
The WTRU performs a transition to the INACTIVE mode, and
  a. The WTRU's configuration for unicast transmission for MBMS services and/or mDRB is no longer applicable;
The WTRU resets the MAC, and:
  a. RRC does not explicitly subsequently reconfigure the MBMS service e.g., from the reception of dedicated signaling.
The WTRU may select a transmission mode that meets the WTRU's capability, MBMS service requirements and/or configuration received from the network and/or according to the received MBMS configuration when it autonomously determines that it may change the transmission mode for MBMS.

The WTRU may initiate a procedure for L2 retransmissions (e.g., the transmission of an MSR) upon a change of transmission mode to enable lossless mode change. The WTRU may initiate the procedure for L2 retransmissions according to the applicable configuration e.g., according to the received configuration if the WTRU can comply with the configuration and/or if the WTRU determines that the reconfiguration was successful.

WTRU-Autonomous Mobility

The WTRU in RRC IDLE or in RRC INACTIVE mode may reselect to a suitable cell that meets a (possibly configurable) cell selection threshold, but that the WTRU would otherwise not have selected for camping, if at least one of the following:
  The MBMS configuration for the selected cell is suitable for meeting the MBMS service requirements;
  The MBMS configuration for the selected cell is within the WTRU's capabilities for receiving the MBMS service;
  Another suitable cell of better quality either does not support, or have sufficient, MBMS configuration for the WTRU's MBMS service. An insufficient MBMS configuration may for example relate to support for HARQ, layering, L2 retransmissions or similar;
  Another suitable cell of better quality has an MBMS configuration that would exceed the WTRU's capabilities for receiving the MBMS service.

The WTRU capability may correspond to any of the WTRU capability aspects described earlier. The MBMS configuration may correspond to any of the MBMS configuration aspects described earlier.

Network-Controlled Mobility—Conditional Mobility

The WTRU configured with conditional handover (CHO) may trigger the mobility reconfiguration if it determines that the MBMS service is degrading below a threshold and/or if it determines that there are problems with the MBMS connectivity and/or radio link. If the CHO configuration includes more than one candidate target cell, the WTRU may select a cell that meets the MBMS service requirements.

Network-Controlled Conditional Mobility

The WTRU in RRC CONNECTED mode and configured with MBMS operation may report suitable neighbor cell(s) that are further suitable to meet the WTRU's MBMS service requirement. Such report may be included in RRC message e.g., in a measurement report. The WTRU may report the MBMS requirement, MBMS service and/or the MBMS ID for the sessions that the WTRU is currently active with. Information about ongoing MBMS sessions may be included in a MAC MBMS CE, possibly triggered upon change of MBMS service reception, included in an RRC response (e.g., RRC Connection Reconfiguration complete response) or in another RRC message e.g., in the measurement report. The WTRU may support additional triggers for measurement reporting that includes MBMS-related triggers, such as when the WTRU determines that there are problems with the MBMS connectivity and/or radio link.

Handling of Mobility Failure

Upon failure of a reconfiguration, with or without mobility, the WTRU may revert to a previous MBMS configuration. Alternatively, the WTRU may autonomously acquire and/or reconfigure the MBMS service to a suitable transmission mode. In this case, it may further trigger the L2 retransmissions procedure (e.g., the transmission of an MSR) to enable recovery of any unsuccessfully received data for the MBMS service. The WTRU may initiate the procedure for L2 retransmissions according to the applicable configuration.

Example Embodiments

Figure 2:
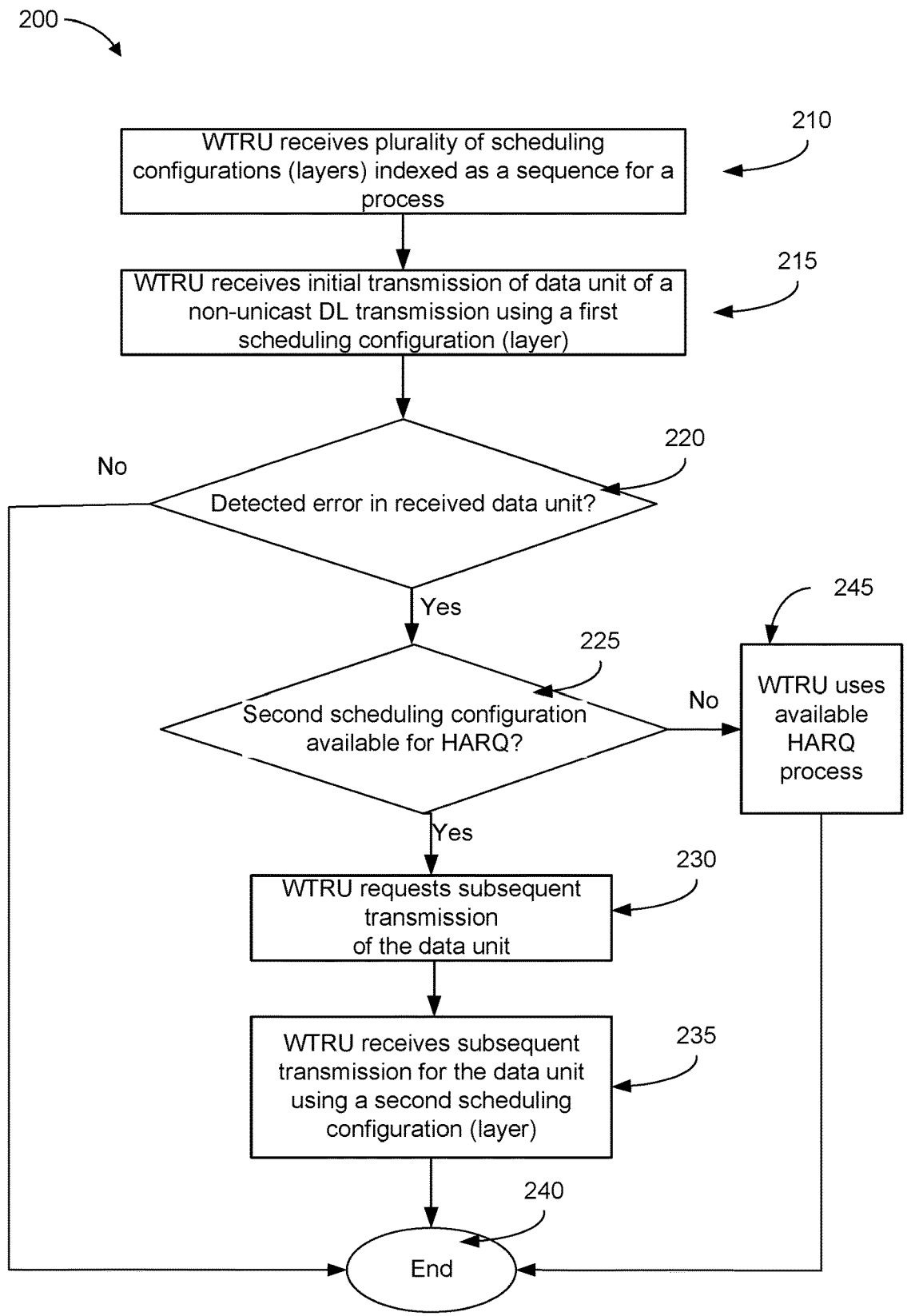
FIG. 2 depicts a flow diagram according to one method of the disclosure.

FIG. 2 is a flow diagram of a method 200 representing aspects of the present innovation. The method 200 is performed by a WTRU. At 210, the WTRU receives a plurality of scheduling configurations indexed as a sequence for a process, such as a HARQ process. The receipt by the WTRU of the plurality of configurations may be made via receipt of unicast or other suitable transmission type from a gNB or other entity capable of configuring the WTRU. In the present example environment, the WTRU is configured to be capable of subsequently receiving a non-unicast downlink transmission method, such as a MBMS transmission from a gNB. At 215, the WTRU receives the non-unicast downlink transmission (e.g. MBMS transmission) from the gNB as an initial transmission containing an information unit (such as a data unit). At 220, the WTRU detects if the information unit (data unit) was received having errors. If no error is detected the method 200 traverses to 240 and the method 200 may stop. If an error of the received information unit is detected at 220, then at 225 the WTRU determines the presence of at least a second scheduling configuration associated with the HARQ process. If no second configuration is available, then the process 220 may move to 245 where an available HARQ process (not involving a second configuration) may be used until the method 200 ends at 240. If it is determined at 225 that at least a second scheduling configuration is available, then the method 200 moves to 230 where the WTRU requests a subsequent transmission of the information unit; a re-transmission of the information unit.

At 235, the WTRU receives a subsequent transmission of the information unit that is then processed in accordance with a second scheduling configuration corresponding to a second HARQ layer. Thereafter, on condition that the HARQ processing using the second scheduling configuration (second HARQ layer) is successful in correcting the information unit, then the method 200 ends at 240. In method 200, the WTRU determines a presence of the second scheduling configuration based on an indication in a control message (such as in a DCI message) received in the first scheduling configuration to process another retransmission of the information unit that was initially received with errors. In another feature, the WTRU determines a presence of the second scheduling configuration based on a configuration aspect of the HARQ process. The information unit may be a transport block (TB) for a process corresponding to hybrid automatic repeat request (HARQ) processing. The subsequent retransmission is the next transmission in a sequence for the HARQ processing. The HARQ processing may correspond to configuration elements of the WTRU. Soft combining of the sequence of HARQ processing of the initial transmission and subsequent transmission for an information unit may address errors detected in the information unit. Soft combining may include the use of either incremental redundancy or chase combining.

The information unit referenced in the method may be a service data unit (SDU). The first scheduling configuration or the second scheduling configuration may be associated with one or more of: a physical downlink control channel (PDCCH), a set of one or more control channel elements, an index of the first CCE for downlink control information (DCI), a control resource set (CORSET), a search space, a time or periodicity, a radio network temporary identifier (RNTI), a physical downlink shared channel (PDSCH), a DCI format or size, and one or a range of aggregation level.

HARQ processes in the method may correspond to WTRU scheduling configurations/parameters identified with HARQ layers. A plurality of HARQ layers may be activated or deactivated by received downlink control information (DCI). In addition, the WTRU may transmit HARQ feedback to the node on the radio access network. In the method, the non-unicast downlink transmission method may be a multimedia broadcast multicast service (MBMS).

Figure 3:
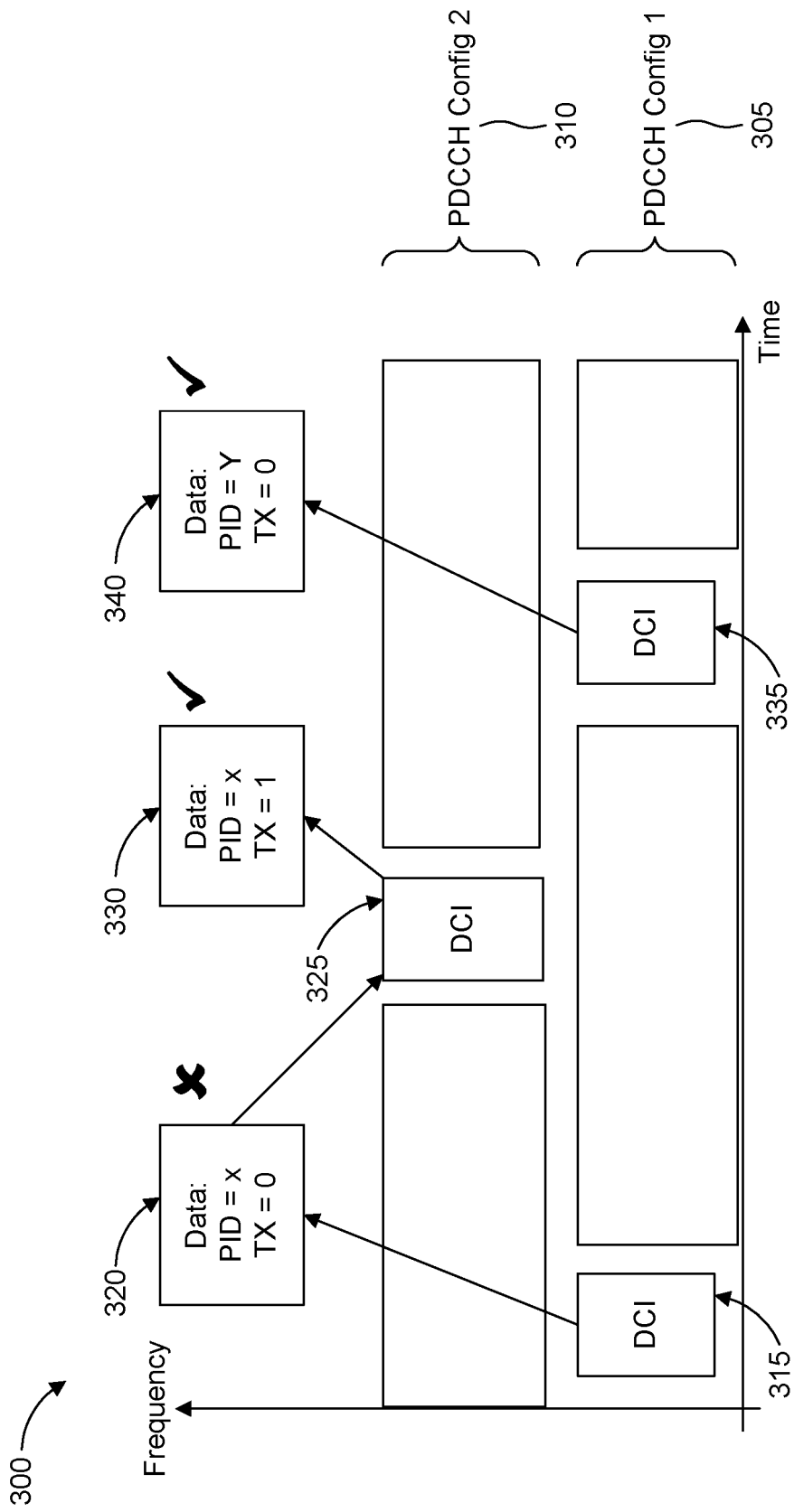
FIG. 3 depicts an example descriptive method according to a method of the disclosure.

FIG. 3 depicts an example depiction of a process 300 involving aspects of HARQ processing using different configurations. The frequency versus time plot of FIG. 3 shows the transmission from a gNB to a WTRU of two configurations usable by the WTRU. In one example, the WTRU may be in discontinuous reception (DRX) mode to receive PDCCH transmissions. Configuration 1 transmission 305 may be received by the WTRU via PDCCH and configuration 2 transmission may be received by the WTRU via PDCCH from the gNB. 305 PDCCH Config 1 and 310 PDCCH Config 2 may be transmitted in different BWPs. 305 PDCCH Config 1 may correspond to a first scheduling configuration and 310 PDCCH Config 2 may correspond to a second scheduling configuration. At 315, a DCI is received via 305 Config 1 which allows a HARQ process at 320 to correct received data associated with process ID x (PID=x) configured to receive initial transmission (Tx=0). If the HARQ process fails to correct the data using PID=x, then the WTRU uses PDCCH config 2 to receive and attempt to decode a second DCI 325. The received data may correspond to a retransmission (TX=1) and be associated with PID=x. In this instance, the data associated with PID=x is decoded successfully using incremental redundancy or chase combining. At 335, a DCI is received by the WTRU using 305 Config 1 that may invoke a HARQ processing associated with another process (PID=y) and may correspond to a initial retransmission (TX=0). In the instance indicated, the HARQ process 340 is successful in decoding the data associated with PID=y using HARQ transmission 0. In one aspect of the above process, the WTRU determines the PDCCH configuration to use based on the HARQ transmission number. Possibly the WTRU may determine the presence of DCI 325 based on an indication in the DCI 315. Possibly the WTRU determine the presence of DCI 325 based on a configuration associated with specific HARQ process ID. A HARQ layer may be conceptualized as a combination of HARQ transmissions (TX number) and associated control channel configurations (Config 1, 2, etc.).

In another view of the present innovation, a WTRU may perform steps configured for layered HARQ operation for MBMS reception. Those steps include receiving a plurality of (HARQ layer) configurations, each consisting of at least one HARQ configuration (retransmission #, process ID, etc.) and associated scheduling configuration. The WTRU may then perform decoding, such as blind decoding, of the first HARQ layer. The WTRU may decode subsequent HARQ layers based on the decoding outcome of the previous HARQ layer. For example, if the decoding of first HARQ layer failed, a second HARQ layer may be decoded. The WTRU may determine presence of additional HARQ layers, Such a determination may be based on an indication in the first received DCI from the gNB. The WTRU may then perform a decoding of the second HARQ layer according the associated scheduling information. Notably, the second HARQ layer may be associated with at least one aspect (RNTI, CORESET, search space, aggregation level) that is different than the first HARQ layer. Thus, the second HARQ layer may provide a successful decode of an MBMS reception after a first HARQ process attempt has failed.

Aspects of another method disclosed hereinabove may include a method performed by a Wireless Transmit/Receive Unit (WTRU) configured with a non-unicast downlink transmission method, the downlink transmission originating from a node on a radio access network. In the method, the WTRU receives a sequence of protocol data units (PDUs) from the node, generates a status report (SR), and transmits the SR to the node where the SR requests a L2 retransmission of at least one missing PDU. The WTRU receives the L2 retransmission from the node and uses the L2 retransmission to address at least one missing PDU from the sequence of PDUs.

In the method, receiving a sequence of PDUs from the node may include receiving a sequence of PDUs in connection with a multimedia broadcast multicast service (MBMS). Transmitting the SR to the node includes transmitting at least one of: a request for retransmission of a PDU, an identity for a service that identifies a flow of data, an identity of the WTRU, an identity of the data radio bearer (DRB) of a service for the WTRU, sequencing information describing receive buffer status, and/or a first missing sequence number PDU (SN PDU).

In the method, generating the SR is triggered by at least one of: a determination that there is at least one PDU missing in the sequence of PDUs, a determination that a transmission of a transport block (TB) has failed for a automatic repeat request (HARQ), a determination that the WTRU is experiencing link problems, a reconfiguration of WTRU retransmission mode for a service to support L2 retransmission, a mobility-related reconfiguration of the WTRU that changes a service area and/or initiates access in a target cell, and the WTRU being configured with a service community and/or lossless operation for a service.

In the method, transmitting the SR to the node may include a SR transmission using one or more of: a physical uplink shared channel (PUSCH), a physical uplink control channel (PUCCH), and a physical random-access channel (PRACH). The WTRU receiving the L2 retransmission from the node may include any of: initiating a timer upon transmission of the MSR, wherein upon timer expiration, the WTRU releases all received PDUs to an upper layer, monitoring of a downlink control indicator to receive a dedicated L2 retransmissions, and receiving retransmissions organized according to layered PDUs, the layered PDUs corresponding to a configuration of the WTRU.

Figure 4:
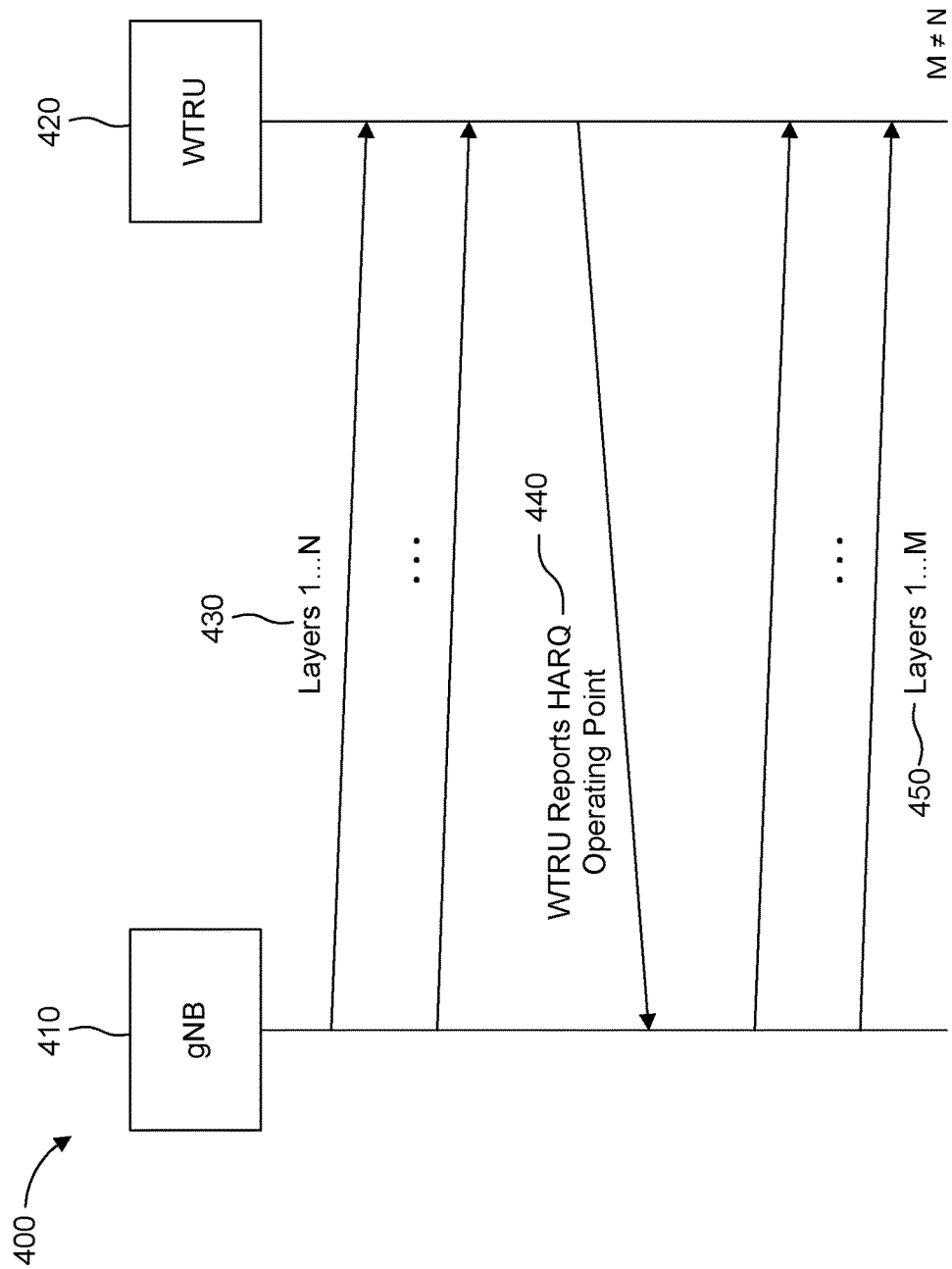
FIG. 4 depicts an example signal diagram according to an aspect of the invention.

FIG. 4 depicts an example message diagram 400 that depicts transactions between a gNB 410 and a WTRU 420 to relay a status report (SR) to the gNB. In diagram 400, at 430, the gNB 410 transmits multiple layers (Layers 1-N) to the WTRU. The layers may represent different and/or related configurations that allow the WTRU to better process some procedures, such as the HARQ procedures described herein. At 440, the WTRU may transmit a SR to the gNB to indicate the observed HARQ Operating Point. One example of a HARQ operating point may be the target number of HARQ transmissions for a TB and/or the number of layers that may be necessary to meet the service requirements. Based on the SR, the gNB at 450 may adjust the number of layers from N to M or adjust the HARQ layer parameters to improve the HARQ operating point.

In one aspect of the disclosure, a WTRU may be configured for layered HARQ operation for MBMS reception. The WTRU may decode a number of HARQ layers in succession. The WTRU may determines the scheduling configuration of each layer as a function of the decoding outcome of the previous layer and the configuration.

In another aspect of the disclosure, a WTRU may measure and report the target/observed HARQ operating point (e.g. min number of HARQ layers for successful reception), periodically or based on configured event triggers. The WTRU may be configured to trigger a conditional reconfiguration based on the status of the MBMS reception. Such status may include such parameters as the quality of the MBMS reception, the number of HARQ layers required exceeding a threshold, in order to determine if a reconfiguration is desirable.

The above methods may be performed by a WTRU and/or may include a computer readable storage medium comprising instructions which when executed by a computer cause the computer to carry out any of the hereinabove methods.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the methods, apparatuses and systems provided above are possible without departing from the scope of the invention. In view of the wide variety of embodiments that can be applied, it should be understood that the illustrated embodiments are examples only and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM")) or non-volatile (e.g., Read-Only Memory (ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

The invention claimed is:

1. A method performed by a wireless transmit/receive unit (WTRU), the method comprising:
receiving configuration information, wherein the configuration information comprises first and second scheduling configuration information, the first and the second scheduling configuration information corresponding to first and second layers of a process, wherein the first layer corresponds to a first downlink transmission associated with a first hybrid automatic repeat request (HARQ) process and the second layer corresponds to a second downlink transmission associated with a second HARQ process;
receiving the first downlink transmission in accordance with the first scheduling configuration information, wherein the first downlink transmission comprises data;
transmitting information to a base station indicating any of a negative acknowledgement (NACK) and a request for another transmission of the data of the first downlink transmission, wherein the information indicating any of a NACK and a request for another transmission of the data of the first downlink transmission is transmitted based on the WTRU being configured with the second scheduling configuration information;
receiving the second downlink transmission in accordance with the second scheduling configuration information, wherein the second downlink transmission comprises the data; and
decoding the data based on the second downlink transmission.

2. The method of claim 1, wherein receiving configuration information comprising the first and second scheduling configuration information comprises receiving the first and the second scheduling configuration information associated with one or more of:
a physical downlink control channel, a set of one or more control channel elements, an index of a first control channel element for downlink control information, a control resource set, a search space, a time or periodicity, a radio network temporary identifier, a physical downlink shared channel, a downlink control information format or size, or one or a range of aggregation levels.

3. The method of claim 1, wherein the second HARQ process is invoked upon a NACK response of the first HARQ process.

4. The method of claim 3, wherein the first HARQ process and the second HARQ process are different processes.

5. The method of claim 1, wherein receiving configuration information further comprises receiving a plurality of scheduling configuration information corresponding to a plurality of layers of the process, wherein the layers of the process are activated or deactivated by received downlink control information, DCI.

6. The method of claim 5, wherein the layers of the process are activated or deactivated using a sequence in a bitmap of the received DCI.

7. The method of claim 1, wherein receiving the first downlink transmission comprises receiving a multimedia broadcast multicast service transmission.

8. The method of claim 1, wherein transmitting information to the base station based on the WTRU being configured with the second scheduling configuration information comprises transmitting information to the base station based on an indication in a control message associated with the first scheduling configuration information.

9. The method of claim 8, wherein the indication in the control message associated with the first scheduling configuration information comprises an indication in downlink control information.

10. The method of claim 1, wherein decoding the data based on the second downlink transmission further comprises decoding using soft combining of the first downlink transmission and the second downlink transmission.

11. A wireless transmit/receive unit (WTRU) configured with
a transceiver and a processor, the WTRU configured to:
receive configuration information, wherein the configuration information comprises first and second scheduling configuration information, the first and the second scheduling information correspond to first and second layers of a process, wherein the first layer corresponds to a first downlink transmission associated with a first hybrid automatic repeat request (HARQ) process and the second layer corresponds to a second downlink transmission associated with a second HARQ process;
receive the first downlink transmission in accordance with the first scheduling configuration information, wherein the first downlink transmission comprises data;
transmit information to a base station indicating any of a negative acknowledgement (NACK) and a request for another transmission of the data of the first downlink transmission, wherein the information indicating any of a NACK and a request for another transmission of the data of the first downlink transmission is transmitted based on the WTRU being configured with the second scheduling configuration information;
receive the second downlink transmission in accordance with the second scheduling configuration information, wherein the second downlink transmission comprises the data; and
decode the data based on the second downlink transmission.

12. The WTRU of claim 11, wherein the transceiver is configured to receive configuration information that further comprises a plurality of scheduling configuration information corresponding to a plurality of layers of the process, wherein the layers of the process may be activated or deactivated by received downlink control information, DCI, wherein the DCI contains a layer sequence in a bitmap.

13. The WTRU of claim 11, wherein the transceiver is configured to receive configuration information comprising the first scheduling configuration information and the second scheduling configuration information, wherein the first scheduling configuration information and the second scheduling configuration information are associated with one or more of:
a physical downlink control channel, a set of one or more control channel elements, an index of a first control channel element for downlink control information, a control resource set, a search space, a time or periodicity, a radio network temporary identifier, a physical downlink shared channel, a downlink control information format or size, or one or a range of aggregation levels.

14. The WTRU of claim 11, wherein the second HARQ process is invoked upon a NACK response of the first HARQ process.

15. The WTRU of claim 11, wherein the transceiver is configured to transmit information to the base station based on an indication in a control message associated with the first scheduling configuration information, the control message comprising an indication in downlink control information.

16. The WTRU of claim 11, wherein the processor is configured to decode the data based on the second downlink transmission using soft combining of the first downlink transmission and the second downlink transmission.

17. The WTRU of claim 11, wherein the transceiver is configured to receive the first downlink transmission comprising a multimedia broadcast multicast service transmission.

\* \* \* \* \*